US006853773B2

(12) United States Patent
Lin

(10) Patent No.: US 6,853,773 B2
(45) Date of Patent: Feb. 8, 2005

(54) TUNABLE FILTER

(75) Inventor: Wenhua Lin, Pasadena, CA (US)

(73) Assignee: Kotusa, Inc., Monterey Park, CA (US)

( * ) Notice: Subject to any disclaimer, the term of this patent is extended or adjusted under 35 U.S.C. 154(b) by 0 days.

(21) Appl. No.: 09/845,685

(22) Filed: Apr. 30, 2001

(65) Prior Publication Data

US 2002/0159698 A1 Oct. 31, 2002

(51) Int. Cl.[7] ............................. G02B 6/34; G02B 1/035
(52) U.S. Cl. .............................. 385/39; 385/37; 385/1; 385/3
(58) Field of Search .................... 385/39, 37, 1–10; 359/288

(56) References Cited

U.S. PATENT DOCUMENTS

| 4,618,210 | A |   | 10/1986 | Kondo |         |
|-----------|---|---|---------|-------|---------|
| 4,747,654 | A |   | 5/1988  | Yi-Yan |        |
| 4,798,437 | A | * | 1/1989  | Rediker et al. | .......... 250/201.2 |
| 4,813,757 | A |   | 3/1989  | Sakano et al. |  |
| 4,846,542 | A |   | 7/1989  | Okayama |    |
| 4,900,112 | A | * | 2/1990  | Kawachi et al. | .............. 385/14 |
| 5,002,350 | A |   | 3/1991  | Dragone |    |
| 5,013,113 | A |   | 5/1991  | Soref   |     |
| 5,039,993 | A |   | 8/1991  | Dragone |    |
| 5,136,671 | A |   | 8/1992  | Dragone |    |
| 5,243,672 | A |   | 9/1993  | Dragone |    |

(List continued on next page.)

FOREIGN PATENT DOCUMENTS

| EP | 0647861 A1 | 4/1995 |
| EP | 0849615 A2 | 6/1998 |
| EP | 0985942 A2 | 3/2000 |
| JP | 63-197923 | 8/1988 |
| JP | 2-179621  | 7/1990 |
| JP | 6-186598  | 7/1994 |
| JP | 6-326420  | 11/1994 |
| WO | WO 98/43128 | 10/1998 |
| WO | WO 99/45420 | 9/1999 |

OTHER PUBLICATIONS

Nowak, E.D. "Speed Power, and Yield Comparison of Thin Bonded sOI versus Bulk CMOS Technologies" Proceedings 1994 IEEE International SOI Conference, Oct. 1994.*

Abe, et al., *Optical Path Length Trimming Technique using Thin–Film Heaters for Silica–Based Waveguides on Si*, Electronics Letters, Sep. 12, 1996, vol.32–No. 19, pp. 1818–1820.

Albert, J., *Planar Fresnel Lens Photoimprinted in a Germanium–Doped Silica Optical Waveguide*, Optics Letters, May 15, 1995, vol. 20–No. 10, pp 1136–1138.

Aman, M.C., *Calculation of Metal–Clad Ridge–Waveguide (MCRW) Laser Modes by Mode Coupling Technique*, Journal of Lightwave Technology, VOL LT–4, No. 6, Jun. 1986, p. 689–693.

Amann, M.C. et al, *Calculation Of The Effective Refractive–Index Step For The Metal–Cladded–Ridge–WaveguideLaser*, Applied Optics, VOL 20, No. 8, Apr. 15, 1981, p. 1483–1486.

(List continued on next page.)

Primary Examiner—David V. Bruce
Assistant Examiner—Krystyna Suchecki
(74) Attorney, Agent, or Firm—Law Offices of Travis L. Dodd, P.C.

(57) ABSTRACT

An optical filter is disclosed. The filter includes a light distribution component having an output side. A plurality of array waveguides are configured to deliver a light signal into the light distribution component such that the light signal is incident on the output side of the light distribution component. The array waveguides are configured to adjust the location where the light signal is incident on the output side.

14 Claims, 23 Drawing Sheets

U.S. PATENT DOCUMENTS

| | | | |
|---|---|---|---|
| 5,412,744 A | | 5/1995 | Dragone |
| 5,450,511 A | | 9/1995 | Dragone |
| 5,467,418 A | | 11/1995 | Dragone |
| 5,473,719 A | | 12/1995 | Stone |
| 5,559,906 A | * | 9/1996 | Maerz ............................ 385/3 |
| 5,581,643 A | | 12/1996 | Wu |
| 5,706,377 A | | 1/1998 | Li |
| 5,745,618 A | | 4/1998 | Li |
| 5,751,872 A | | 5/1998 | Bissessur et al. |
| 5,841,931 A | | 11/1998 | Foresi et al. |
| 5,862,279 A | * | 1/1999 | Amersfoort et al. ........ 385/129 |
| 5,938,811 A | | 8/1999 | Greene |
| 6,091,864 A | * | 7/2000 | Hofmeister ................. 359/254 |
| 6,094,513 A | * | 7/2000 | Rigny et al. .................. 385/24 |
| 6,108,478 A | | 8/2000 | Harpin et al. |
| 6,118,909 A | | 9/2000 | Chen et al. |
| 6,167,168 A | | 12/2000 | Dieckroeger |
| 6,175,671 B1 | * | 1/2001 | Roberts ..................... 359/17.7 |
| 6,222,957 B1 | | 4/2001 | Lin et al. |
| 6,272,270 B1 | | 8/2001 | Okayama |
| 6,374,001 B1 | | 4/2002 | Bozeat et al. |
| 6,377,723 B1 | | 4/2002 | Saito et al. |
| 6,418,249 B1 | | 7/2002 | Nakamura et al. |
| 6,449,084 B1 | * | 9/2002 | Guo ........................... 359/315 |

OTHER PUBLICATIONS

Baba, S. et al., *A Novel Integrated–Twin–Guide (ITG) Optical Switch with a Built–in TIR Region*; IEEE Photonics Technology Letters; VOL 4, No. 5, May 1992, p. 486–488.

Benson, T.M., *Etched–Wall Bent–Guide Structure for Integrated Optics in the III–V Semiconductors*; Journal of Lightwave Technology, VOL LT–2, No. 1, Feb. 1984; p. 31–34.

Berry, G.M. et al., *Analysis Of Multiplayer Semiconductor Rib Waveguides With High Refractive Index Substrates*, Electronics Letters; VOL 29, No. 22; Oct. 28, 1993, p. 1941–1942.

Betty, I. et al., *A Robust, Low–Crosstalk, InGaAsP/InP Total–Internal–Reflection Switch For Optical Cross–Connect Application*.

Burke, S.V., *Spectral Index Method Applied to Coupled Rib Waveguides*; Electronics Letters, VOL 25, No. 9, Apr. 27, 1989, p. 605–606.

Burns, W.K. et al., *Mode Conversion in Planar–Dielectric Separating Waveguides*; IEEE Journal of Quantum Electronics, VOL QE–11, No. 1, Jan. 1975; p. 32–39.

Cai, Y. et al., *A Novel Three–Guide Optical Coupler Using A Taper–Formed Waveguide*; j. Appl. Phys 69(5), Mar. 1991; p. 2810–2814.

Cavailles, J.A. et al., *First Digital Optical Switch Based on InP/GaInAsP Double Heterostructure Waveguides*; Electronics Letters, VOL 27, No. 9, Apr. 25, 1991, p. 699–700.

Chen, R.T. et al., *Design and Manufacturing of WDM Devices*; Proceedings of SPIE VOL 3234.

Clemens, et al., *Wavelength–Adapable Optical Phased Array in SiO$_2$–Si*, Photonics Technology Letters, Oct. 1995, vol. 7–No. 10, 1040–1041.

Dagli, N. et al., *Analysis of Rib Dielectric Waveguides*; IEEE Journal of Quantum Electronics, VOL QE–21, No. 4, Apr. 1985, p. 315–321.

Dagli, N. et al., *Theoretical and Experimental Study of the Analysis and Modeling of Integrated Optical Components*; IEEE Journal of Quantum electronics, VOL 24, No. 11, Nov. 1988; p. 2215–2226.

Deri, R.J., et al., *Low–Loss GaAs/AIGaAs Waveguide Phase Modulator Using A W– Shaped Index Profile*; Sep. 6, 1988.

Deri, R.J., et al., *Low–Loss Multiple Quantum Well GaInAs/InP Optical Waveguides*; Feb. 21, 1989.

Devaux, F. et al., *20Gbit/s Operation of a High–Efficiency InGaAsP MQW Electroabsorption Modulator With 1.2–V Drive Voltage*; IEEE Photonics Technology Letters, VOL 5, No. 11, Nov. 1993, p. 1288–1290.

Doerr, C.R. et al., *Chirping Of The Waveguide Grating Router For Free–Spectral–Range Mode Selection In The Multifrequency Laser*, IEEE Photonics Technology Letters, Apr. 1996, vol. 8–No. 4, pp 500–502.

Doerr, C.R. et al., *Chromatic Focal lane Displacement in the Parabolic Chirped Waveguide Grating Router*, May 1997, vol. 9–No. 5, pp 625–627.

Dragone, c. *Efficient NxN Star Couplers Using Fourier Optics*, pp 479–48, Mar. 1989, vol. 7–No. 3, Journal of Lightwave Technology.

Fischer, et al., *Singlemode Optical Switches Based on SOI Waveguides with Large Cross–Section*, Electronics Letters, Mar. 3, 1994, vol. 30–No. 5, pp. 406–408.

Fischer, K. et al, *Sensor Application Of SiON Integrated Optical Waveguides On Silicon*; Elevier Sequoia, 1992; p. 209–213.

Fish, G. et al., *Monolithic InP Optical Crossconnects: 4×4 and Beyond*, JWB2–1, p. 19–21.

Furuta, H. et al, *Novel Optical Waveguide For Integrated Optics*, Applied Optics, vol. 13, No. 2, Feb. 1974, p. 322–326.

Gini, E. et al., *Low Loss Self–Aligned Optical Waveguide Comer Mirrors in InGaAsP/InP*, We P2.22.

Goel, K. et al *Design Considerations for Low Switching Voltage Crossing Channel Switches*; Journal of Lightwave Technology, VOL 6, No. 6, Jun. 1988; p. 881–886.

Granestrand, P. et al., *Integrated Optics 4×4 Switch Matrix with Digital Optical Switches*; Electronics Letters, VOL 26, No. 1, Jan. 4, 1990; p. 4–5.

Himeno, A. et al., *Loss Measurement and Analysis of High–Silica Reflection Bending Optical Waveguides*, Journal of Lightwave Technology, Jan. 1988, vol. 6–No. 1, 41–46.

Hsu, K.Y. et al., *Photonics devices and Modules*, www.c-c.nctu.edu.tw/–ctr/lee_mti/research_topic/photonic_devices_modules.htm, pp. 1–3.

Huang, T.C. et al., *Depletion Edge Translation Waveguide Crossing Optical Switch*, IEEE Photonics Technology Letters; VOL 1, No. 7, Jul. 1989, p. 168–170.

Hutcheson, L.D. et al., *Comparison of Bending of Losses in Integrated Optical Circuits*; Optics Letters, VOL 5, No. 6, Jun. 1980, p. 360–362.

Inoue, H. et al, *Low Loss GaAs Optical Waveguides*, Journal of Lightwave Technology, VOL LT–3, No. 6, Dec. 1985; p. 204–209.

Irace, A. et al., *Fast Silicon–on–Silicon Optoelectronic Router Based on a BMFET Device*, Journal of Selected Topics in Quantum Electronics, Jan./Feb. 2000, vol. 6–No. 1, pp. 14–18.

Ito, F. et al., *Carrier–Injection–Type Optical Switch In GaAs With A 1.06–1.55 μm Wavelength Range*; Appl. Physics Letters, 54(2) Jan. 9, 1989 p. 134–136.

Jackman, N. et al., *Optical Cross Connects for Optical Networking*; Bell Labs Technical Journal, Jan.–Mar. 1999; p. 262–281.

Johnston, I.R., et al., *Silicon–Based Fabrication Process For Production Of Optical Waveguides*; IEE Proc–Optoelectron., VOL 143, No. 1, Feb. 1996, p. 37–40.

Kaenko, A. et al., *Athermal Silica–based Arrayed–waveguide Grating (AWG) Multiplexers with New Loss Groove Design*; TuO1–1, p. 204–206.

Kasahara, R. et al., *Low–Power Consumption Slica–Based 2×2 Thermooptic Switch Using Trenched Silicon Substrate*, IEEE Photonics Technology Letters, VOL 11, No. 9, Sep. 1999, p. 1132–1134.

Khan, M.N. et al., *Fabrication–Tolerant, Low–Loss, and High–Speed Digital Optical Switches in InGaAsP/InP Quantum Wells*; Proc 21$^{st}$ Eur.Conf.on Opt.Comm.(ECOC '95–Brussels), p. 103–106.

Khan, M.N. et al., *High–Speed Operation of Quantum Well Electron Transfer Digital Optical Switches*; p. 102–102c.

Kirihara, T. et al., *Lossless And Low Crosstalk 4=4 Optical Swtich Array; Electronics And Communications In Japan*; Part 2, VOL 77, No. 11, 1994, p 73–81.

Kirihara, T. et al., *Lossless and Low–Crosstalk Characteristics in an InP–Based 2=2 Optical Switch*, IEEE Photonics Technology Letters, VOL 5, No. 9 Sep. 1993, p. 1059–1061.

Kokubun, Y. et al., *Athermal Waveguides for Temperature–Independent Lightwave Devices*, Nov. 1993, 1297–1298, vol. 5–No. 11, IEEE Photonics Technology Letters.

Kokubun, Y. et al., *Temperature–Independent Narrowband Optical Filter at 1.3 µm Wavelength by an Athermal Waveguide*, Oct. 10, 1996, vol. 32–No. 21, Electronics Letters.

Kokubun, Y. et al., *Temperature–Independent Optical Filter at 1.55 µm Waveguide Using a Silica–Based Athermal Waveguide*, Feb. 19, 1998, vol. 34–No. 4, Electronics Letters.

Kokubun, Y. et al., *Three–Dimensional Athermal Waveguides for Temperature Independent Lightwave Devices*, Jul. 21st, 1994, vol. 30–No. 15, Electronics Letters.

Kostrzewa, C. et al., *Tunable Polymer Optical Add/Drop Filter for Multiwavelength Networks*, Photonics Technology Letters, Nov. 1997, vol. 9–No. 11, 1487–1489.

Laakman, K. D. et al., *Waveguides: Characteristic Modes Of Hollow Rectangular Dielectric Waveguides*; Applied Optics, VOL 15, No. 5, May 1976; p. 1334–1340.

Lee, T.P. et al., *Al$_x$Ga$_{1-x}$As Double–Heterostructure Rib–Waveguide Injection Laser*; IEEE Journal of Quantum Electronics; VOL QE–11, No. 7, Jul. 1975; p. 432–435.

Liu, Y.L. et al., *Silicon 1×2 Digital Optical Switch Using Plasma Dispersion*; Electronics Letters, VOL 30, No. 2, Jan. 20, 1994; p. 130–131.

Mak, G. et al., *High–Speed Bulk InGaAsP–InP Electroabsorption Modulators with Bandwidth in Excess of 20 GHz*, IEEE Photonics Technology Letter, VOL 2, No. 10, Oct. 1990, p. 730–733.

Marcatili, E., *Improved Coupled–Mode Equations for Dielectric Guides*; IEEE Journal of Quantum Electronics, VOl QE–22, No. 6, Jun. 1986; p. 988–993.

Marcatili, E.A.J., *Bends in Optical Dielectric Guides*; The Bell System Technical Journal, Sep. 1969; p. 2103–2132.

Marcatili, E.A.J., *Dielectric Rectangular Waveguide and Directional Coupler for Integrated Optics*, The Bell System Tecnical Journal, Sep. 1969 p 2071–2101.

Marcatili, E.A.J., *Slab–Coupled Waveguides*; The Bell System Technical Journal, Apr. 1974; American Telephone & Telegraph Company, VOL 53, No. 4, Apr. 1974.

Mirza, A.R. et al, *Silicon Wafer Bonding For MEMS Manufacturing*, Solid State Technology, Aug. 1999, p. 73–78.

Moerman, I. et al., *A Review on Fabrication Technologies for the Monolithic Integration of Tapers with III–V Semiconductor Devices*; IEEE Journal of Selected Topics in Quantum electronics, VOL 3, No. 6, Dec. 1997, p. 1308–1320.

Müller, G. et al., *First Low Loss InP/InGaAsP Optical Switch with Integrated Mode Transformers*; ThC12.10; p. 37–40.

Nayyer, J. et al., *Analysis of Reflection–Type Optical Switches with Intersecting Waveguides*, Journal of Lightwave Technology, VOL 6, No. 6, Jun. 1988; p. 1146–1152.

Negami, t. et al., *Guided–Wave Optical Wavelength Demultiplexer Using An Asymmetric Y Junction*; Appl. Phys. Lett. 54 (12), Mar. 20, 1989; p. 1080–1082.

Nelson, W. et al., *Optical Switching Expands Communications–Network Capacity*; Laser Focus World, Jun. 1994, p 517–520.

Nelson, W.H. et al., *Wavelength–and Polarization–Independent Large Angle InP/InGaAsP Digital Optical Switches with Extinction Ratios Exceeding 20 dB*; IEEE Photonics Technology Letters, VOL 6, No. 11, Nov. 1994; p. 1332–1334.

Noda, Y. et al., *High–Speed Electroabsorption Modulator with Strip–Loaded GaInAsP Planar Waveguide*; Journal of Lightwave Technology, VOL LT–4, No. 10, Oct. 1986, p. 1445–1453.

Offrein, B.J. et al., *Resonant Coupler–Based Tunable Add–After–Drop Filter in Silicon–Oxynitride Technology for WDM Networks*, Journal of Selected Topics in Quantum Electronics, vol. 5–No. 5, 1400–1405.

Okamoto, K. et al., *Arrayed–Waveguide Grating Multiplexer With Flat Spectral Response*; Optics Letters, Jan. 1, 1995; VOL 20, No. 1; p. 43–45.

Okamoto, K. et al., *Flat Spectral Response Arrayed–Waveguide Grating Multiplexer with Parabolic Waveguide Horns*, Electronics Letters Online Jul. 15, 1996, No. 19961120, pp. 1661–1662.

Okayama, H. et al., *8×8 Ti:LiNbO$_3$ Waveguide Digital Switch Matrix*; IEICE Trans. Commun.; VOL E77–B, No. 2; Feb. ; p. 204–208.

Okayama, H. et al., *Dynamic Wavelength Selective Add/Drop Node Comprising Tunable Gratings, Electronics Letters Online*, Apr. 10, 1997, No. 19970607.

Okayama, H. et al., *Reduction of Voltage–Length Product for Y–Branch Digitlal Optical Switch*, Journal of Lightwave Technology, VOL 11, No. 2, Feb. 1993; p. 379–387.

Okuno, M. et al., *Strictly Nonblocking 16×16 Matrix Switch Using Silica Based Planar Lightwave Circuits*, VOL 10, No. 266, Sep. 11, 1986.

Ooba, N. et al., *Athermal Silica–Based Arrayed–Waveguide Grating Multiplexer Using Bimetal Plate Temperature Compensator*, Electronics Letters, Oct. 12$^{st}$, 2000, vol. 36, No. 21, pp 1800–1801.

Renaud, M. et al., *Compact Digital Optical Switches for Low Insertion Loss Large Switch Arrays on InP*;Proc. 21$^{st}$ Eur. Conf.on Opt. Comm. (ECOC '95–Brussels), p. 99–102.

Rickman, A.G. et al., *Silicon–on–Insulator Optical Rib Waveguide Loss and Mode Characteristics*, Journal of of Lightwave Technology, Oct. 1994, vol. 12–No. 10, p 1771–1776.

Rolland, C. et al., *10Gbit/s, 1.56 μm, Multiquantum Well InP/InGaAsP Mach–Zehnder Optical Modulator*; Electronics Letters, Mar. 4, 1993, VOL 29, No. 5, p. 471–472.

Santec Sales Brochure for year 2000 entitled "Optical Components".

Schauwecker, B. et al, *Small–Size Silicon–Oxynitride AWG Demultiplexer Operating Around 725 nm*, IEEE Photonics Technology Letters, vol. 12 No. 12, Dec. 2000.

Schlachetzki, A. *Monolithic IO–Technology–Modulators and Switches Based on InP*; SPIE VOL 651 Integrated Optical Circuit Engineering III (1986) , p. 60–86.

Silberberg, Y. et al., *Digital Optical Switch*; Appl. Phys. Lett.; VOL 51, No. 16, Oct. 19, 1987, p. 152–154.

Smit, M.K., *New Focusing and Dispersive Planar Component Based on an Optical Phased Array*; Electronics Letters; Mar. 31, 1988, VOL 24, No. 7; p. 385–386.

Smith, S.D. et al., *CW Operation of Corner Cavity Semiconductor Lasers*; IEEE Photonics Technology Letters, VOL 5, No. 8, Aug. 1993; p. 876–879.

Sneh, A. et al., *Compact Low Crosstalk and Low Propagation Loss Quantum–Well Y–Branch Switches*; PDP 4–1–4–5.

Soole, J.B.D. et al., *Use of Multimode Interference Couplers to Broaden the Passband of Wavelength–Dispersive Integrated WDM Filters*; IEEE Photonics Technology Letters, VOL 8, No. 10, Oct. 1996; p 1340–1342.

Stoll, L. et al., *1:8 Optical Matrix Switch on InP/InGaAsP with Integrated Mode Transformers*; Optical Switches and Modulators II, p 531–534.

Stoll, L. et al., *Compact and Polarization Independent Optical Switch on InP/InGaAsP*; TuB7.2; p. 337–340.

Stutius, W. et al, *Silicon Nitride Films On Silicon For Optical Waveguides*, Applied Optics, VOL 16, No. 12, Dec. 1977, p. 303–307.

Sugie, T. et al., *1.3 –μm Laser Diodes with a Butt–jointed Selectively Grown Spot–Size Converter*; ThB2–6, IOOC95, p 52–53.

Tada, K. et al., *Bipolar Transistor Carrier–Injected Optical Modulator/Switch: Proposal and Analysis*, IEEE Electron Device Letters, VOL EDL–7, No. 11, Nov. 1986, p. 605–606.

Takada, et al., *Optical Spectrum analyzer using Cascaded AWG's with Different Channel Spacings*, Photonics Technology Letters, Jul. 1999, vol. 11, No. 7, pp. 863–864.

Takahashi, H. et al., *Arrayed Waveguide Grating for Wavelength Division Multi/Demultilexer with Nanometre Resolution*, PWG–NTT–7.

Takiguchi, K. et al, *Dispersion Compensation Using a Planar Lightwave Circuit Optical Equalizer*, Photonics Technology Letters, Apr. 1994, vol. 6, No. 4, pp. 561–564.

Tien, P.K. et al., *Formation of Light–Guiding Interconnects in an Integrated Optical Circuit by Composite Tapered–Film Coupling*; Applied Optics, VOL 12, No. 8, Aug. 1973; p 1909–1916.

Toyoda et al., *Thermoplastic Switch and Wavelength Tunable Filter using Polymer Waveguides*, Abstract of paper presented at Opticomm 2001 on Aug. 22, 2001.

Treyz, G. V. et al., *Silicon Optical Modulators at 1.3 μm Based on Free–Carrier Absorption*; IEEE Electron Device Letters, VOL 12, No. 6, Jun. 1991; p. 276–278.

Tsuda, H. et al., *Performance Analysis of a Dispersion Compensator Using Arrayed–Waveguide Gratings*, Journal of Lightwave Technology, Aug. 2000, vol. 18–No. 8, pp 1139–1147.

Tsuda, H. et al., *Second– and Third–Order Dispersion Compensator Using a High–Resolution Arrayed Waveguide Grating*, IEEE Photonics Technology Letters, May 1999, vol. 11–No. 5, 569–571.

Vinchant et al, *InP 4×4 Digital–Optical–Switch Module For Multiwavelength Cross–Connet Applications*; OFC '95 Technical Digest, Thursday ThK2, p. 281–282.

Vinchant, J.F. et al., *First Polarisation Insensitive 4=4 Switch matrix on InP with Digital Optical Switches*, TuB7.3, p 341–344.

Vinchant, J.F. et al., *InP Digital Optical Switch: Key Element for Guided– Wave Photonic Switching*; IEE Proceedings–J, VOL 140, No. 5, Oct. 1993; p. 301–307.

Vinchant, J.F. et al., *Low Driving Voltage or Current Digital Optical Switch on InP for Multiwavelength System Applications*; Electronics Letters, VOL 28, No. 12, Jun. 4, 1992; p 1135–1137.

Wakita, K. et al., *Long Wavelength Waveguide Multiple Quantum Well Optical Modulators*; IEEE Journal of Quantum Electronics, VOL QE–23, No. 12, Dec. 1987, p. 2210–2215.

Wanru, Z. et al., *Total Internal Reflection Optical Switch with injection Region isolated by Oxygen for Implantation*; pp 1–10.

Yamada, et al., *Cross Talk Reduction in a 10 GHz Spacing Arrayed–Waveguide Grating by Phase–Error Compensation*, Journal of Lightwave Technology, Mar. 1998, vol. 16–No. 3, pp. 364–371.

Yanagawa, H. et al., *Polarization–and Wavelength–Insensitive Guided–Wave Optical Switch with Semicondutor Y Junction*; Journal of Lightwave Technology, VOL 8, No. 8, Aug. 1990, p. 1192–1197.

Yu, S. et al., *High Speed All–Optical Packet Routing Using A Vertical Coupler Crosspoint Space Switch*.

Yu, S. et al., *Ultralow Cross–Talk, compact integrated optical crosspoint space switch arrays employing active InGaAsP/InP Vertical Waveguide Couplers*, Integrated Optical Crosspoint Switch Arrays, Siyuan Yu et a, CPD24–2.

Zengerle, R. et al., *Tapered Twin Waveguides For Spot–Size Transformation In InP*; TheB2–5; IOOC 95; p. 50–51.

Zirngibl, M. et al., *Digitally Tunable Laser Based On The Integration Of A Waveguide Grating Multiplexer And An Optical Amplifier*, IEEE Photonics Technology Letters, Apr. 1994, vol. 6–No. 4, pp 516–517.

Zucker, J.E. et al., *Strained Quantum Wells for Polarization–Independent Electrooptic Waveguide Switches*Journal of Lightwave Technology, VOL 10, No. 12, Dec. 1992, p. 1926–1930.

Amersfoort, et al., *Passband Broadening of Integrated Arrayed Waveguide Filters Using Multimode Interference Couplers*, Electronics Letters, Feb. 29th, 1996, vol. 32, No. 5, pp. 449–451.

Sugita, et al., *Very Low Insertion Loss Arrayed–Waveguide Grating with Vertically Tapered Waveguides*, IEEE Photonics Technology Letters, vol. 12, No. 9, Sep. 2000, pp 1180–1182.

Kasahara, et al., *Low–Power Consumption Silica–Based 2 ×2 Thermooptic Switch Using Trenched Silicon Substrate*, IEEE Photonics Technology Letters, Vol 11, No. 9, Sep. 1999, pp. 1132–1134.

Doerr, et al., *40–Channel Multi/Demultiplexer with Dynamic Passband Shape Compensation*, IEEE Photonics Technology Letters, Vol 13, No. 7, Jul. 2001, pp. 690–692.

Lowery, et al., *270–km Gbit/s WDM Dispersion Compensation Using a Chirped AWGM*, FD5–1, pp74–76.

Okamoto, et al., *Flat Spectral Response Arrayed–Waveguide Grating Multiplexer with Parabolic Waveguide Horns*, Electronics Letters, Aug. 29, 1996, vol. 32, No. 18, pp. 1661–1662.

Toyoda, et al., *Wide Tuning Range and Low Operating Power AWG–Based Thermo–Optic Wavelength Tunable Filter Using Polymer Waveguides*, Electronics Letters, Aug. $30^{th}$, 2001, vol. 37, No. 18, pp. 1130–1132.

Uetsuka, et al., *Wavelength Division Multi–Demultiplexer with Arrayed Waveguide Grating*, IEICE Trans. Electron., Vol E80–C, No. 5, May 1997, pp. 619–624.

* cited by examiner

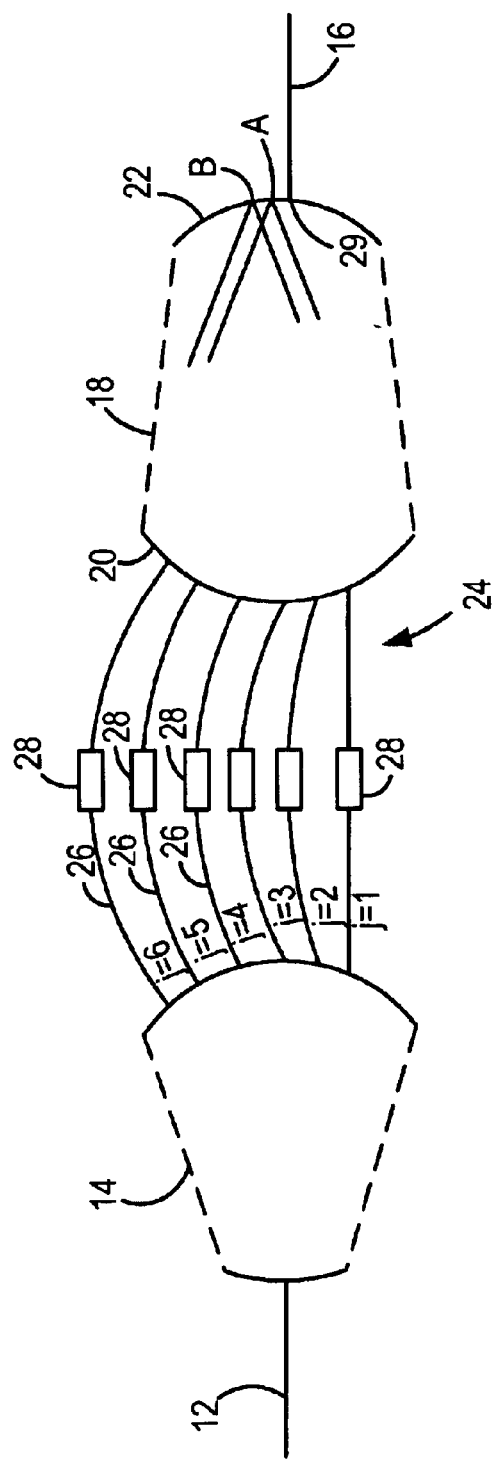
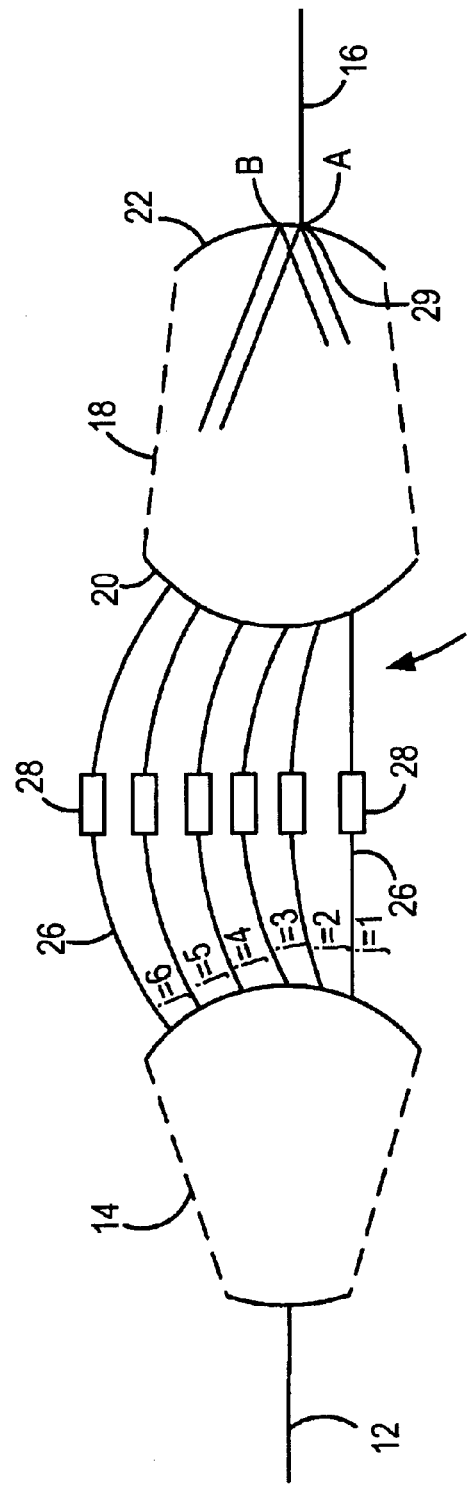
Figure 2A
Figure 2B

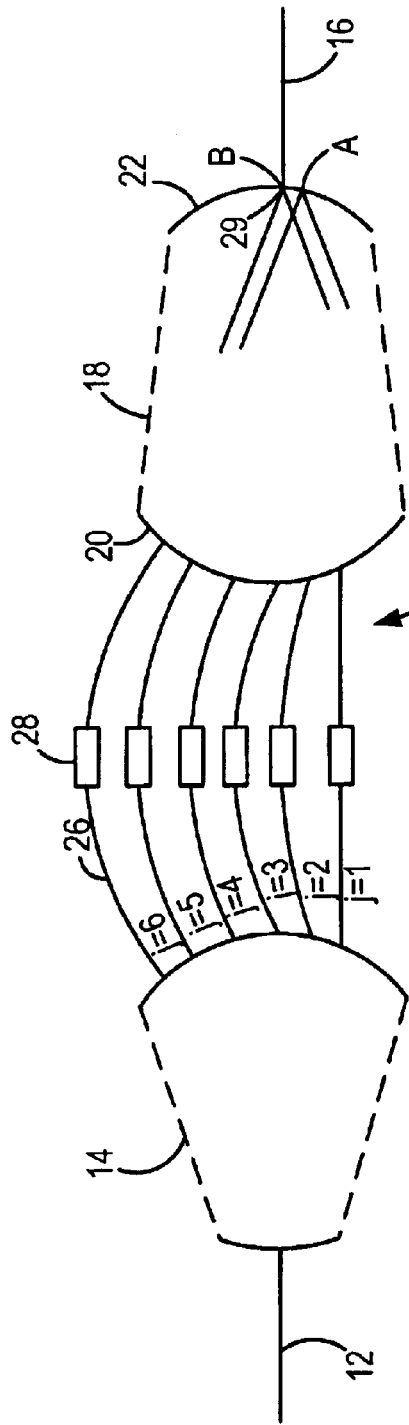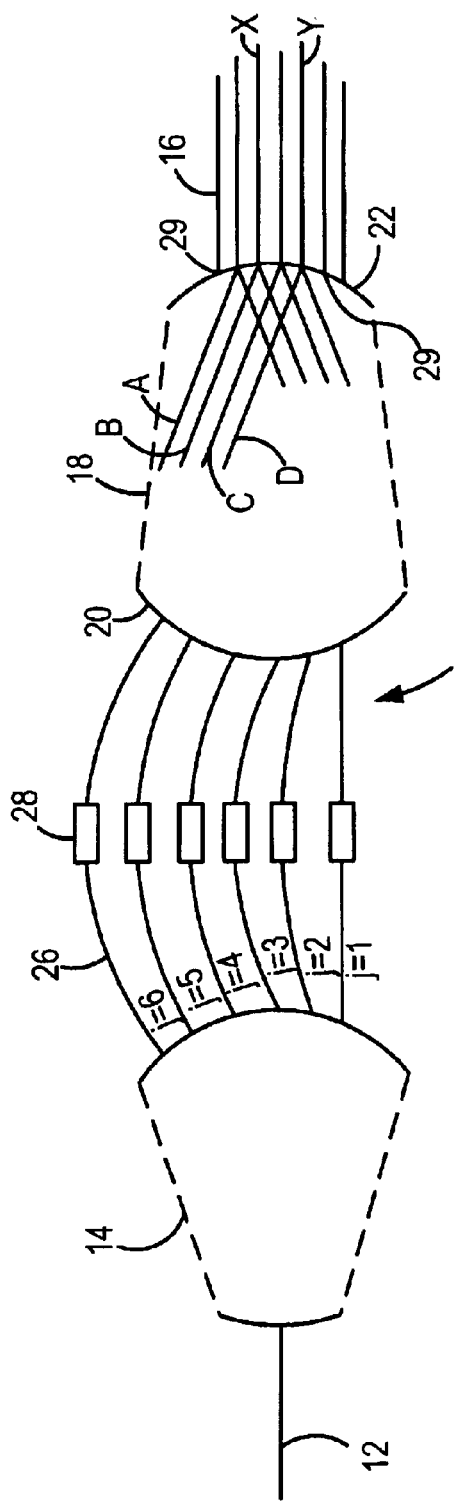

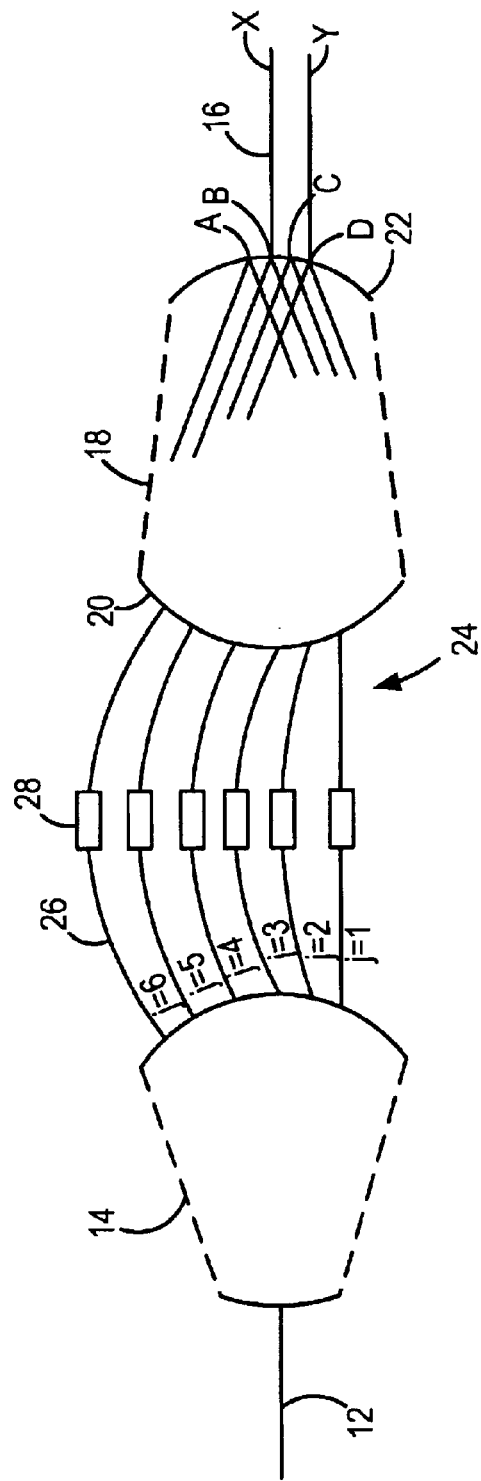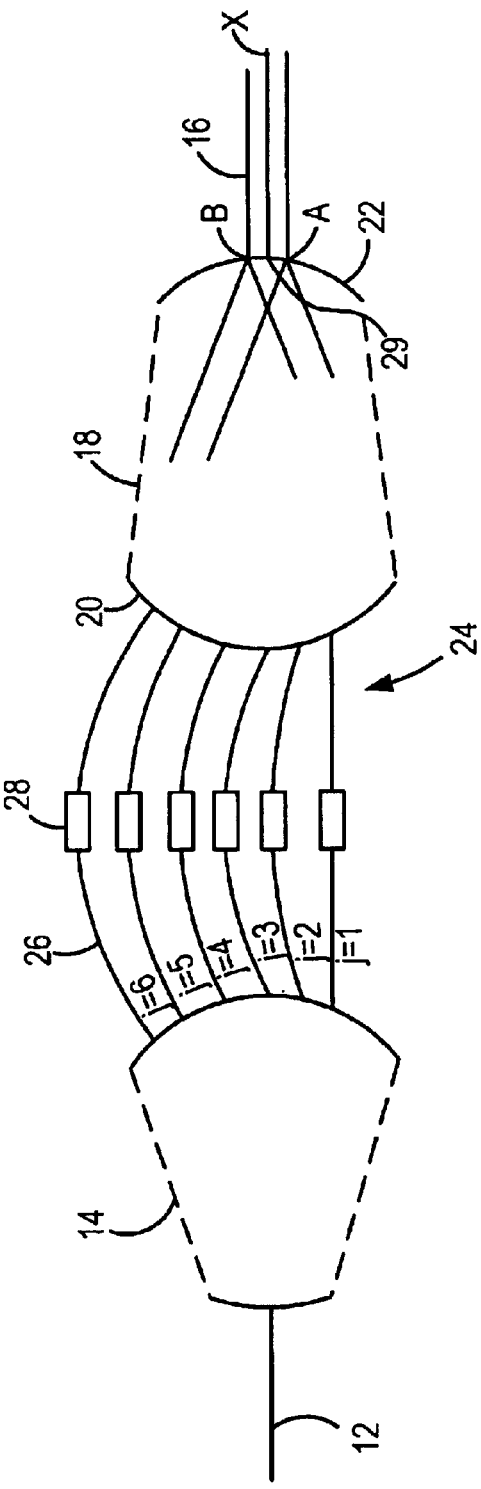

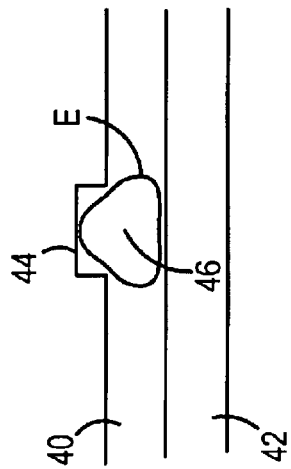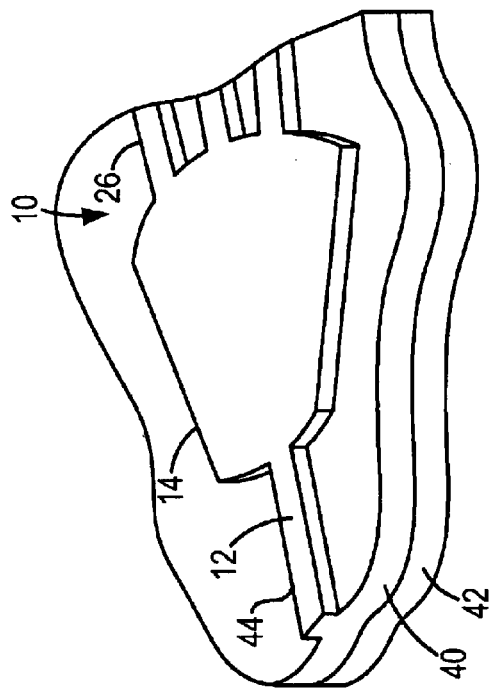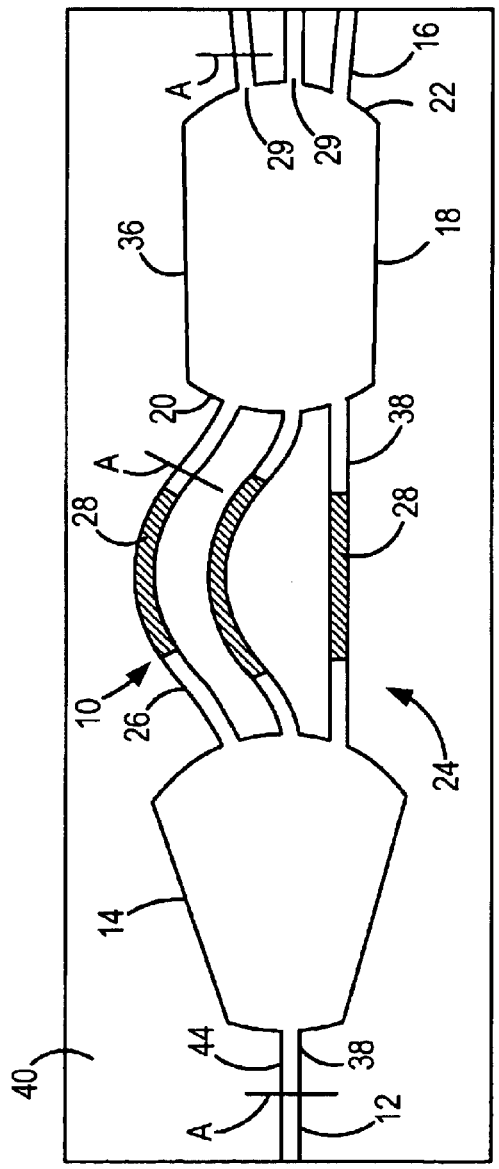
Figure 3C
Figure 3B
Figure 3A

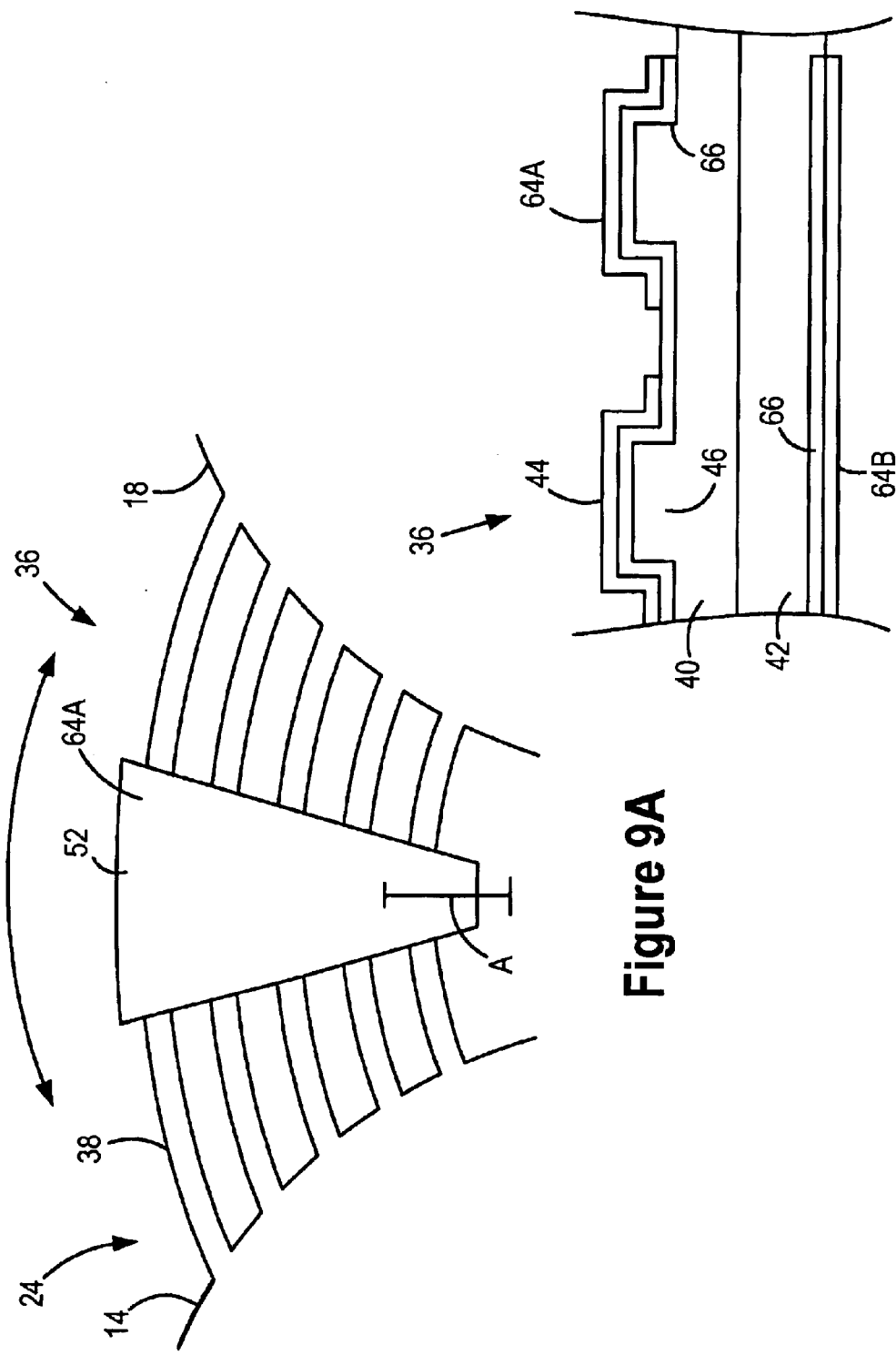

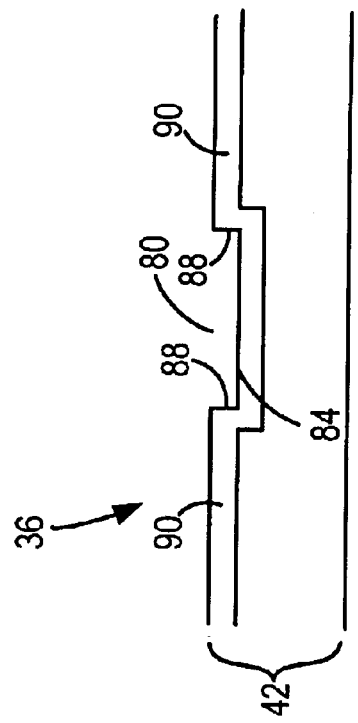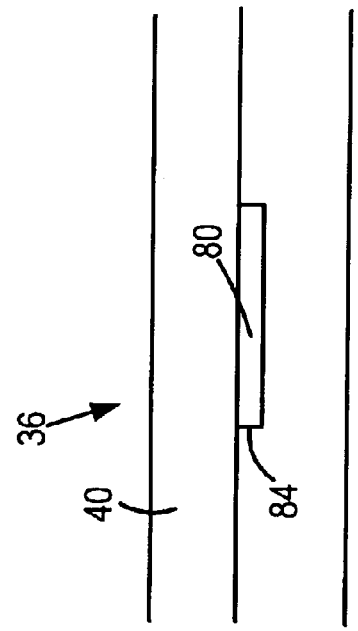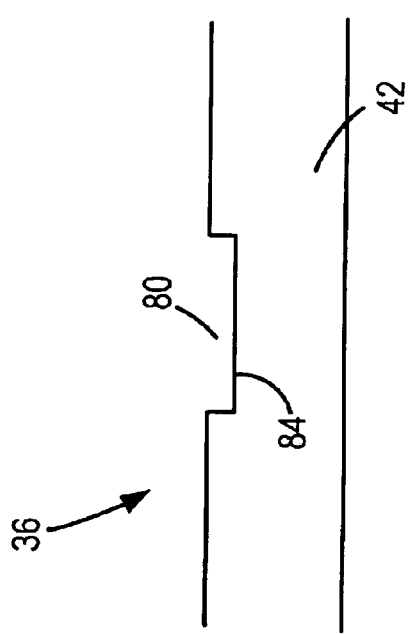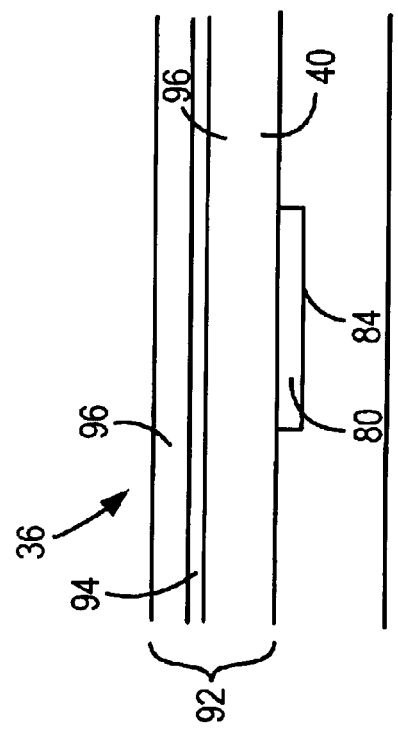

TUNABLE FILTER

BACKGROUND

1. Field of the Invention

The invention relates to one or more optical networking components. In particular, the invention relates to optical filters.

2. Background of the Invention

The wavelength division multiplexing technique allows a waveguide to carry more than one channel of information in a multichannel beam of light. Each channel is carried on a light signal having a unique wavelength.

Filters are often employed to separate one or more of the channels from the multi-channel beam. Tunable filters allow the selection of channels that are separated from the multi-channel beam to be changed. However, many of these tunable filters include moving parts that make the tunable filters difficult to integrate with other optical components. Further, the bandwidth of many of these tunable filters changes as the filter is tuned.

For the above reasons, there is a need for an improved optical filter.

SUMMARY OF THE INVENTION

The invention relates to an optical filter. The filter includes a light distribution component having an output side. A plurality of array waveguides are configured to deliver a light signal into the light distribution component such that the light signal is incident on the output side of the light distribution component. The array waveguides are configured to adjust the location where the light signal is incident on the output side.

Another embodiment of the filter includes a light distribution component having an output side. A plurality of array waveguides are configured to deliver a light signal into the light distribution component such that the light signal is incident on the output side of the light distribution component. At least a portion of the array waveguides include an effective length tuner. Each effective length tuner is configured to change the effective length of an array waveguide.

Yet another embodiment of the filter includes a light distribution component having an output side. A plurality of array waveguides are configured to deliver a light signal into the light distribution component such that the light signal is incident on the output side of the light distribution component. A plurality of the array waveguides each include one or more effective length tuners. The effective length tuners are configured to change the effective length of the array waveguides such that the location where the light signal is incident on the output side of the light distribution component changes.

A further embodiment of the filter includes a light distribution component having an output side. A plurality of array waveguides are configured to deliver a light signal into the light distribution component such that the light signal is incident on the output side of the light distribution component. The array waveguides include one or more first effective length tuners configured to change the effective length of the array waveguides such that the location where the light signal is incident on the output side of the light distribution component changes over a first tuning range. The array waveguides also include one or more second effective length tuners configured to change the effective length of the array waveguides such that the location where the light signal is incident on the output side of the light distribution component changes over a second tuning range. In some instances, the first tuning range is different than the second tuning range. In some instances, the one or more first effective length tuners and/or the one or more second effective length tuners include a common effective length tuner.

The invention also includes a component having a plurality of array waveguides formed in a light transmitting medium positioned over a base. An isolation groove positioned between the waveguides extends into the light transmitting medium. In some instances, the isolation groove extends through the light transmitting medium to the base. In other instances, the isolation groove extends into the base. In still other instances, the isolation groove undercuts the waveguides.

The invention also relates to a method for operating an optical filter. The method includes obtaining an optical component having a plurality of array waveguides in optical communication with an input side of a light distribution component. The array waveguides are configured to deliver a light signal into the light distribution component such that the light signal is incident on the output side of the light distribution component. The method also includes changing the effective length of at least a portion of the array waveguides such that the location where the light signal is incident on the output side of the light distribution component changes.

BRIEF DESCRIPTION OF THE FIGURES

FIG. 2A illustrates a filter having a light distribution component with an input side and an output side. An output waveguide is connected to the output side. A channel labeled A and a channel labeled B are incident on the output side of the light distribution component.

FIG. 2B illustrates the filter of FIG. 2A tuned such that the channel labeled A appears on the output waveguide.

FIG. 2C illustrates the filter of FIG. 2A tuned such that the channel labeled B appears on the output waveguide.

FIG. 2D illustrates a filter having a plurality of output waveguides. The output waveguides have inlet ports with a spacing that substantially matches that channel spacing.

FIG. 2E illustrates a filter having a plurality of output waveguides. The output waveguides have inlet ports spaced at a multiple of the channel spacing.

FIG. 2F illustrates a filter having a plurality of output waveguides. The output waveguides have inlet ports spaced at a fraction of the channel spacing.

FIG. 3A is a perspective view of an optical component including an optical filter.

FIG. 3B is a topview of an optical component having an optical filter.

FIG. 3C is a cross section of the component shown in FIG. 3B at any of the lines labeled A.

FIG. 9A illustrates a common effective length tuner including a plurality of electrical contacts. A first electrical contact positioned over ridges of the array waveguides and a second electrical contact positioned under the ridges.

FIG. 9B is a cross section of the component shown in FIG. 9A taken at the line labeled A.

FIG. 13A through FIG. 13G illustrate a method of forming an optical component having a filter.

DETAILED DESCRIPTION OF THE PREFERRED EMBODIMENT

The invention relates to an optical filter. The filter includes a light distribution component having an input side and an output side. A plurality of array waveguides are connected to the input side and one or more output waveguides are connected to the output side. The array waveguides are configured to deliver a light signal into the light distribution component such that the light signal is incident on the output side of the light distribution component.

A plurality of the array waveguides include an effective length tuner. Each effective length tuner is configured to change the effective length of an array waveguide. The effective length tuners are configured to change the effective length of the array waveguides such that the location where the light signal is incident on the output side of the light distribution component changes. The location can be changed such that the light signal is incident on a particular output waveguide.

In some instances, the light signal is one of a plurality of light signals. The array waveguides are configured such that each light signal is incident on the output side at a different location on the output side. The effective length tuners are configured to change the effective length of the array waveguides such that the location where each of the light signals is incident on the output side of the light distribution component changes. The locations can be changed such one or more of the light signals are incident on an output waveguide. Accordingly, the light signal that appears on a particular output waveguide can be selected.

The filter does not include any moving parts. Further, the bandwidth of the filter does not substantially change as the light signal that appears on an output waveguide changes. Accordingly, the filter overcomes the shortcomings of the prior art.

Figure 1A:
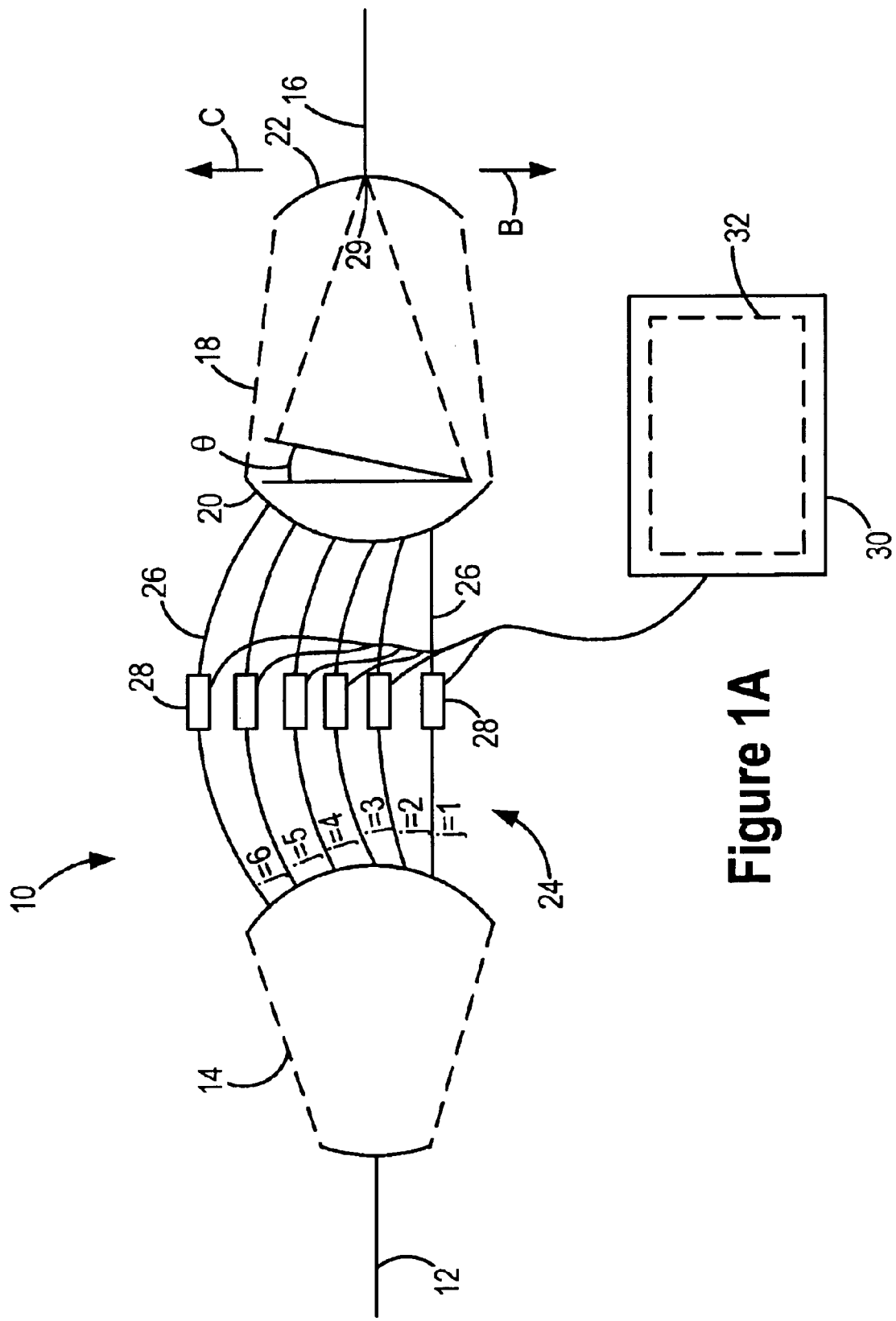
FIG. 1A illustrates a filter according to the present invention.

FIG. 1A illustrates an embodiment of a filter 10 according to the present invention. The filter 10 includes at least one input waveguide 12 in optical communication with a first light distribution component 14 and an output waveguide 16 in optical communication with a second light distribution component 18. The second light distribution component 18 has an input side 20 and an output side 22. A suitable first light distribution component 14 and/or second light distribution component 18 may include, without limitation, star couplers, Rowland circles, multimode interference devices, mode expanders and slab waveguides. Although a single output waveguide 16 is illustrated, the filter 10 can include a plurality of output waveguides 16.

An array waveguide grating 24 connects the first light distribution component 14 and the second light distribution component 18. The array waveguide grating 24 includes a plurality of array waveguides 26. The array waveguides 26 each have a different effective length. Further, the difference in the effective length of adjacent array waveguides 26, $\Delta L$, is a constant. Because the array waveguides 26 are often curved, the length is not consistent across the width of the array waveguide 26. As a result, the effective length is often the length averaged across the width of the array waveguide 26. Although six array waveguides 26 are illustrated, filters 10 typically include many more than six array waveguides 26, and fewer are possible. Increasing the number of array waveguides 26 can increase the degree of resolution provided by the array.

During operation of the liter 10, a light signal enters the first light distribution component 14 from the input waveguide 12. For the purposes of simplifying the discussion, the light signal is presumed to be a single channel light signal. The first light distribution component 14 distributes the light signal to the array waveguides 26. Each array waveguide 26 receives a fraction of the light signal. Each array waveguide 26 carries the received light signal fraction to the second light distribution component 18. A light signal fraction traveling through a long array waveguide 26 will take longer to enter the second light distribution component 18 than a light signal fraction traveling through a shorter array waveguide 26. Unless the effective length differential, $\Delta L$, between adjacent array waveguide 26 is a multiple of the light wavelength, the light signal fraction traveling through a long array waveguide 26 enters the second light distribution component 18 in a different phase than the light signal fraction traveling along the shorter array waveguide 26.

The light signal fraction entering the second light distribution component 18 from each of the array waveguides 26 combines to re-form the light signal. Because the array waveguide 26 causes a phase differential between the light signal fractions entering the second light distribution component 18 from adjacent array waveguides 26, the light signal is diffracted at an angle "the diffraction angle" labeled $\theta$. The second light distribution component 18 is constructed to converge the light signal at a location on the output side 22 of the second light distribution component 18. The location where the light signal is incident on the output side 22 of the second light distribution component 18 is a function of the diffraction angle, $\theta$. As illustrated in FIG. 1A, the phase differential causes the light signal to be converged at the output waveguide 16. As a result, the light signal appears on the output waveguide 16.

Because $\Delta L$ is a different fraction of the wavelength for each channel, the amount of the phase differential is different for different channels. As a result, different channels are diffracted at different angles and are accordingly converged at different locations on the output side 22. Hence, when a multichannel beam enters the second light distribution component 18, each of the different channels is converged at a different location on the output side 22. Since one of the channels can typically be converged on the output waveguide 16, the output waveguide 16 generally carries only one of the channels at a time.

The array waveguides 26 each include an effective length tuner 28 for tuning the effective length of the array waveguide 26. In some instances, the effective length tuners 28 are configured to increase the effective length of the array waveguides 26. In other instances, the effective length tuners 28 are configured to decrease the effective length of the array waveguides 26. In still other instances, the effective length tuners 28 are configured to increase or decrease the effective length of the array waveguides 26.

Although changing the effective length of an array waveguide 26 can be accomplished by changing the physical length of the array waveguide 26, other methods for changing the effective length are possible. For instance, the effective length of an array waveguide 26 can be changed by changing the amount of time required for a light signal to travel through the array waveguide 26. When the array waveguide 26 is changed so a longer time is required for a light signal to travel through the array waveguide 26, the effective length of the array waveguide 26 is increased and when the array waveguide 26 is changed so a shorter period of time is required for the light signal to travel through the array waveguide 26, the effective length is decreased. As will be discussed in more detail below, one method of changing the effective length of an array waveguide 26 is to change the index of refraction of the array waveguide 26.

Although not illustrated, a temperature electronic controller (TEC) can be employed to keep the temperature of the filter 10 at a constant level.

A controller 30 is in communication with the effective length tuners 28. The controller 30 can include electronics 32 for operating the effective length tuners 28. The electronics 32 can include one or more processors. Suitable processors include, but are not limited to, programmed general purpose digital computers, microprocessors, digital signal processors (DSP), integrated circuits, application specific integrated circuits (ASICs), logic gate arrays and switching arrays.

The electronics 32 can include one or more machine readable media for storing instructions to be executed by the processor and/or for storing information to be used by the processor while executing instructions. Suitable machine readable media include, but are not limited to, RAM, electronic read-only memory (e.g., ROM, EPROM, or EEPROM), or transmission media such as digital and/or analog communication links.

The electronics 32 are configured to control the effective length tuners 28 so as to change the effective length of the array waveguides 26. The effective length of the array waveguides 26 is changed such that the value of the effective length differential, $\Delta L$, changes. Changing the value of the effective length differential, $\Delta L$, changes the phase differential of the channels entering the second light distribution component 18. The changed phase differential causes the channels to be diffracted at different angles and accordingly changes the location where the channels are incident on the output side 22. As a result, the effective length tuners 28 are configured to change the location where the channels are incident on the output side 22. Further, the effective length tuners 28 can be operated so a selected channel is incident on a port 29 of the output waveguide 16. Because the output waveguide 16 will carry the channel that is incident on the port 29 of the output waveguide 16, the effective length tuners 28 can be operated so a selected channel appears on the output waveguide 16.

Figure 1B:
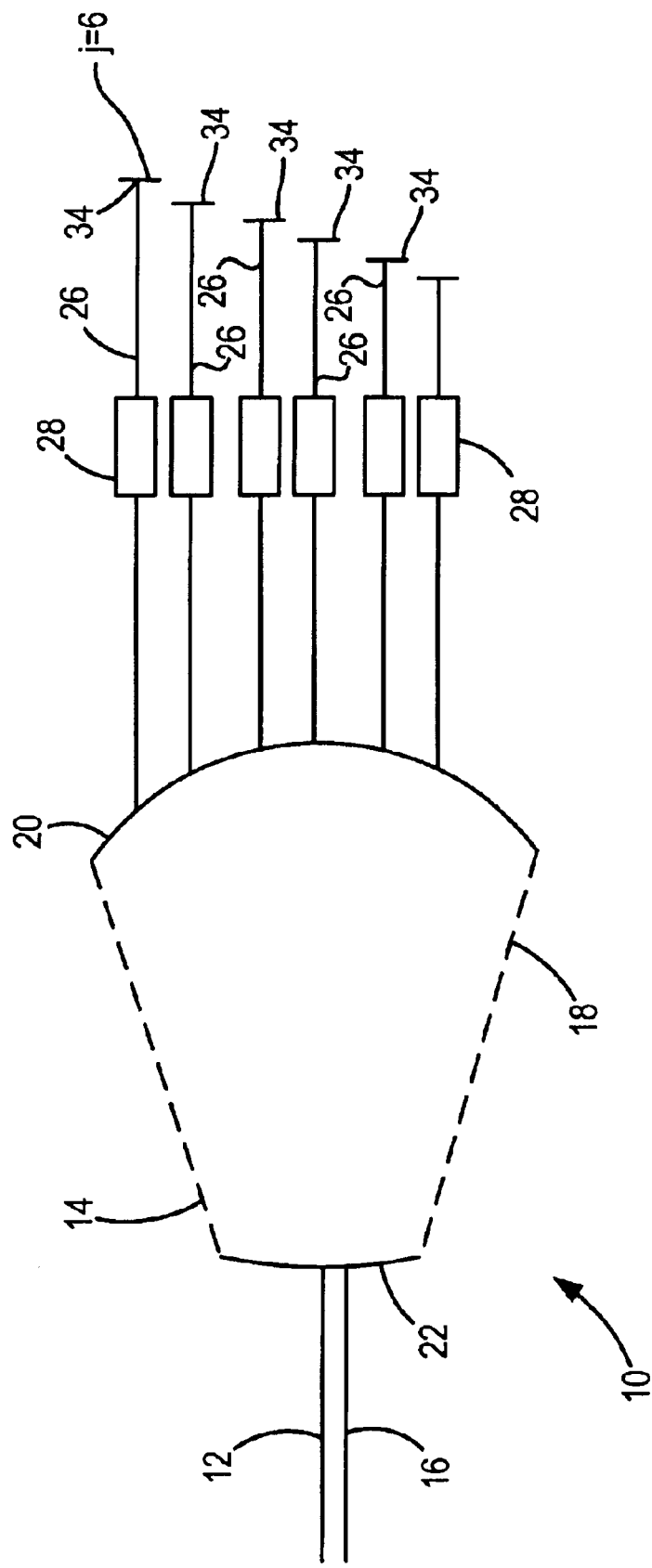
FIG. 1B illustrates a filter having a single light distribution component.

The filter shown in FIG. 1B can be constructed with a single light distribution component 14 by positioning reflectors 34 along the array waveguides as shown in FIG. 1A. The filter 10 includes an input waveguide 12 and an output waveguide 16 that are each connected to the output side 22 of the first light distribution component 14. The array waveguides 26 include a reflector 34 configured to reflect light signal portions back toward the light distribution component.

During operation of the filter 10, a first light signal from the input waveguide 12 is distributed to the array waveguides 26. The array waveguides 26 carry the light signal portions to the reflector 34 where they are reflected back toward the first light distribution component 14. The first light distribution component combines the light signal portions so as to re-form the light signal and converge the light signal at the output waveguide 16. As a result, the output waveguide 16 carries the re-formed light signal.

The light signal portions travel through each array waveguide 26 twice. As a result, the light signal portions experience the effects of the effective length tuners more than once. Accordingly, the effects of the effective length tuners are enhanced. The enhanced effect can provide for a more efficient filter. For instance, the same effective length tuners can provide a filter according to FIG. 1B with a larger wavelength tuning range than is achieved with a filter according to FIG. 1A. Further, less power can be applied to the effective length tuners of FIG. 1B than is applied to the same effective length tuners used in the filter of FIG. 1A to achieve the same change in the wavelength carried on the output waveguide.

Figure 1C:
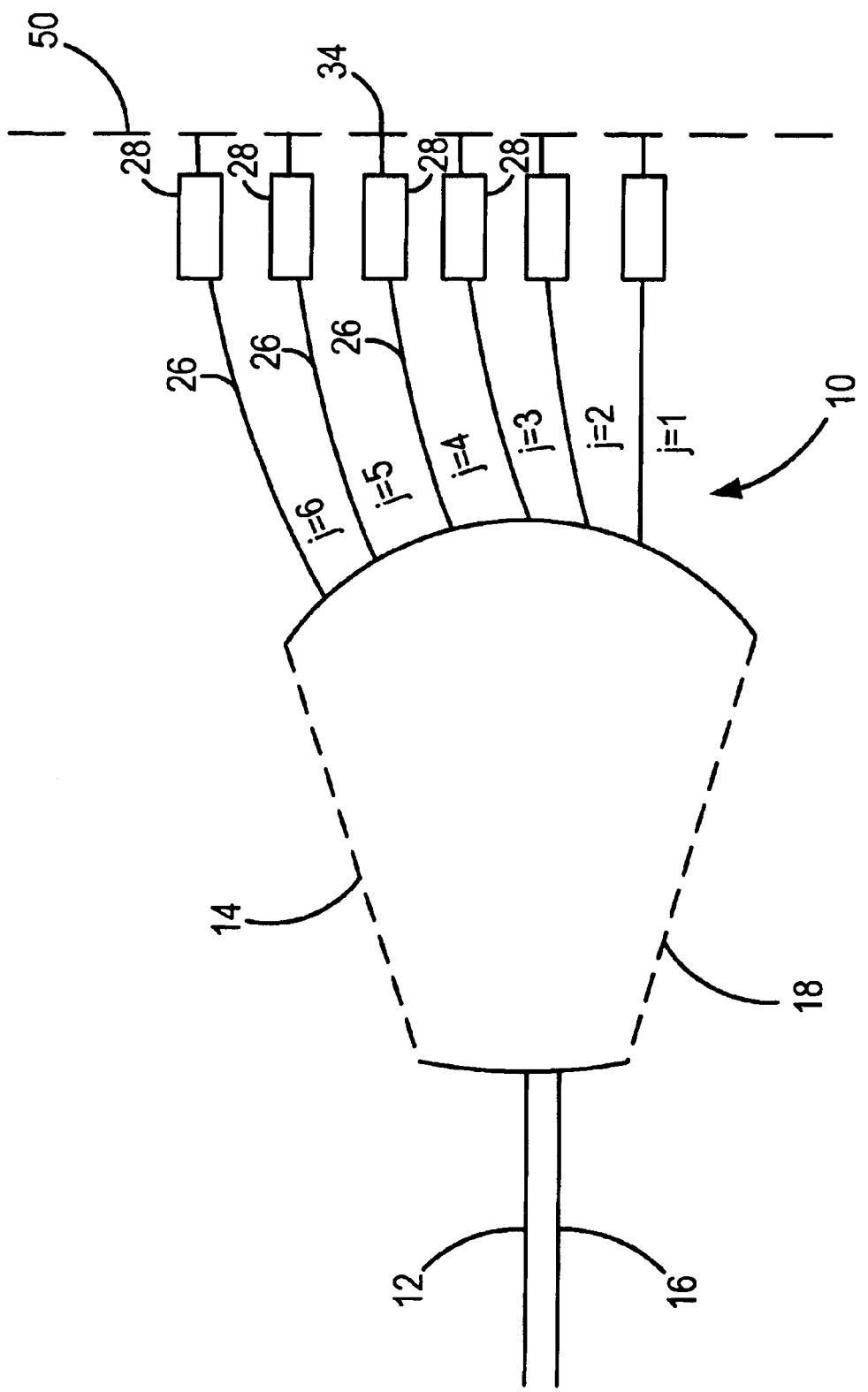
FIG. 1C illustrates another embodiment of a filter having a single light distribution component.

FIG. 1C illustrates another embodiment of a filter 10 having a single light distribution component and curved array waveguides 26. The filter 10 is included on an optical component. The edge of the optical component is shown as a dashed line. The edge of the optical component can include one or more reflective coatings positioned so as to serve as reflector(s) 34 that reflect light signals from the array waveguides back into the array waveguides. Alternatively, the edge of the optical component can be smooth enough to act as a mirror that reflects light signals from the array waveguide back into the array waveguide. The smoothness can be achieved by polishing or buffing. An optical component having a dispersion compensator according to FIG. 1C can be fabricated by making an optical component having a filter 10 according to FIG. 1A and cleaving the optical component down the center of the array waveguides. When the optical component is symmetrical about the cleavage line, two optical components can result. Because the light signal must travel through each array waveguide twice, each resulting dispersion compensator will provide about the same dispersion compensation as would have been achieved before the optical component was cleaved. the optical component can be smooth enough to act as a mirror that reflects Although the filter 10 of FIG. 1B and FIG. 1C is shown with a single input waveguide 12 and a single output waveguide, the filter 10 can include a plurality of input waveguides 12 and/or a plurality of output waveguides.

The effective length tuners 28 are configured to change the effective length of each array waveguide 26 by a different amount. The difference in the amount of effective length change between adjacent array waveguide 26 is the effective length change differential, $\delta 1$. The effective length tuners 28 are configured so the effective length change differential, $\delta 1$, is a constant for adjacent array waveguides 26. More specifically, the value of the effective length change differential, $\delta 1$, is the same for different pairs of adjacent array waveguides 26. When the effective length change differential, $\delta 1$, is a constant, the value of the effective length differential, $\Delta L$, changes.

When there are j=1 through N array waveguides 26, the effective length tuners 28 can be configured to change the effective length of the array waveguides 26 so the total change in effective length for the j-th array waveguide 26 is j*$\delta 1$ or (j=1)* $\delta 1$. As an example, FIG. 1A illustrates an array waveguide grating 24 with 6 array waveguides 26. As a result, N=6 for the illustrated array waveguide grating 24. Each of the array waveguides 26 are labeled as j=1 through 6. The effective length tuners 28 can be configured to change the effective length of the array waveguides 26 so the total change in effective length for the j-th array waveguide 26 is j*$\delta 1$. When the effective length tuners 28 are operated so as to increase the effective length of the array waveguides 26, the effective length differential, $\Delta L$, increases. The increase in the effective length differential, $\Delta L$, causes the diffraction angle, $\theta$, to increase. As a result, the light signal shifts in the direction of the arrow labeled B. When the effective length tuners 28 are operated so as to decrease the effective length of the array waveguides 26, the effective length differential, $\Delta L$, decreases. The decrease in the effective length differential, $\Delta L$, causes the diffraction angle, $\theta$, to decrease. As a result, the light signal shifts in the direction of the arrow labeled C.

Alternatively, the effective length tuners 28 can be configured to change the effective length of the array waveguides 26 so the change effective length for the j-th array waveguide 26 is (N−j)* $\delta 1$ or (N+1−j)* $\delta 1$. As an example, the effective length tuners 28 of FIG. 1A can be configured to change the effective length of the array waveguides 26 so the change in effective length for the j-th array waveguide 26 is (7−j)* $\delta 1$. When the effective length tuners 28 are operated so as to increase the effective length of the array waveguides 26, the effective length differential, $\Delta L$, decreases. The decrease in the effective length differential, $\Delta L$, causes the diffraction angle, $\theta$, to decrease. As a result, the light signal shifts in the direction of the arrow labeled C. When the effective length tuners 28 are operated so as to decrease the effective length of the array waveguides 26, the effective length differential, $\Delta L$, increases. The increase in the effective length differential, $\Delta L$, causes the diffraction angle, $\theta$, to increase. As a result, the light signal shifts in the direction of the arrow labeled B.

FIG. 2A through FIG. 2C illustrate operation of the filter so a particular channel appears on the output waveguide 16. FIG. 2A illustrates the location where a first channel labeled A and a second channel labeled B each are incident on the output side 22 of the second light distribution component 18 when the effective length tuners 28 are not engaged. Each of the channels is incident on the output side 22 above the output waveguide 16. As a result, neither channel appears on the waveguide 16.

The degree of change in the effective length change differential, $\delta 1$, affects the degree of change in the location where a channel is incident on the output side 22. For instance, operating the effective length tuners 28 so as to create a large effective length change differential, $\delta 1$, creates a large shift in the location where a channel is incident on the output side 22 while operating the effective length tuners 28 so as to create a smaller effective length change differential, $\delta 1$, causes a smaller shift in the location. The effective length tuners 28 are operated so a particular channel appears on the output waveguide 16. For instance, the effective length tuners 28 can be operated so as to create an effective length change differential, δ1, that shifts the channel labeled A so it is incident on the port 29 of the output waveguide 16 as shown in FIG. 2B. When the channel labeled A is incident on the port 29 of the output waveguide 16, the channel labeled A appears on the output waveguide 16. Alternatively, the effective length tuners 28 can be operated to create an effective length change differential, δ1, with a larger magnitude and shift the channel labeled B so it is incident on the port 29 of the output waveguide 16 as shown in FIG. 2C. When the channel labeled B is incident on the port 29 of the output waveguide 16, the channel labeled B appears on the output waveguide 16.

The channels illustrated in FIG. 2A through FIG. 2C shift together. For instance, when the channel labeled A is shifted so as to be incident on the port 29 of the output waveguide 16 as shown in FIG. 2B, the channel labeled B also shifts toward the output waveguide 16. Further, when the channel labeled B is shifted toward so as to be incident on the port 29 of the output waveguide 16 as shown in FIG. 2C, the channel labeled A also shifts past the output waveguide 16.

The filter can include more than one output waveguide 16 as shown in FIG. 2D. The filter includes an output waveguide 16 labeled X, an output waveguide 16 labeled Y and a plurality of channels labeled A through D. The ports 29 of the output waveguides 16 are spaced at about the channel spacing. The channel spacing is about equal to the spacing between the locations where the channels are incident on the output side 22. As a result, each output waveguide 16 can carry a different channel. Further, the channel spacing remains substantially constant as the channels are shifted. As a result, the channels can be shifted so each of the output waveguides 16 carries a different channel than it carried before. For instance, the output waveguide 16 labeled X is illustrated as carrying the channel labeled B and the output waveguide 16 labeled Y carrying the channel labeled D. However, the effective length tuners 28 can be operated so the output waveguide 16 carry different channels. For instance, the output waveguide 16 labeled X can carry the channel labeled A and the output waveguide 16 labeled Y can carry the channel labeled C.

The output waveguides 16 can be spaced at a multiple of the channel spacing as shown in FIG. 2E. In this arrangement, a portion of the channels will not be carried on an output waveguide 16. For instance, the channel labeled C is not carried on an output waveguide 16. However, the channels can be shifted so the channel labeled C is carried on an output waveguide 16. For instance, the channels can be shifted so the channel labeled C is carried on the output waveguide 16 labeled Y and the channel labeled A is carried on the output waveguide 16 labeled Y.

The output waveguides 16 can be spaced at a fraction of the channel spacing as shown in FIG. 2F. In this arrangement, a portion of the output waveguides 16 will not carry a channel. For instance, the output waveguide 16 labeled X does not carry a channel. However, the channels can be shifted so the channel labeled X carries a channel.

FIG. 3A illustrates a suitable construction for an optical component having a filter 10 according to the present invention. A portion of the filter 10 is shown on the component. The illustrated portion has a first light distribution component 14, an input waveguide 12 and a plurality of array waveguides 26. FIG. 3B is a topview of an optical component having a filter 10 constructed according to FIG. 2A. FIG. 3C is a cross section of the component 36 in FIG. 3B taken at any of the lines labeled A. Accordingly, the waveguide illustrated in FIG. 3C could be the cross section of an input waveguide 12, an array waveguide 26 or an output waveguide 16.

For purposes of illustration, the filter 10 is illustrated as having three array waveguides 26 and an output waveguide 16. However, array waveguide gratings 24 for use with a filter 10 can have many more than three array waveguides 26. For instance, array waveguide gratings 24 can have tens to hundreds or more array waveguides 26.

The component includes a light transmitting medium 40 formed over a base 42. The light transmitting medium 40 includes a ridge 44 that defines a portion of the light signal carrying region 46 of an input waveguide 12, an array waveguide 26 or an output waveguide 16. Suitable light transmitting media include, but are not limited to, silicon, polymers, silica, SiN, $LiNbO_3$, GaAs and InP. As will be described in more detail below, the base 42 reflects light signals from the light signal carrying region 46 back into the light signal carrying region 46. As a result, the base 42 also defines a portion of the light signal carrying region 46. The line labeled E illustrates the profile of a light signal carried in the light signal carrying region 46 of FIG. 3C. The light signal carrying region 46 extends longitudinally through the input waveguide 12, the first light distribution component 14, each the array waveguides 26, the second light distribution component 18 and each of the output wave guides 16.

Figure 3D:
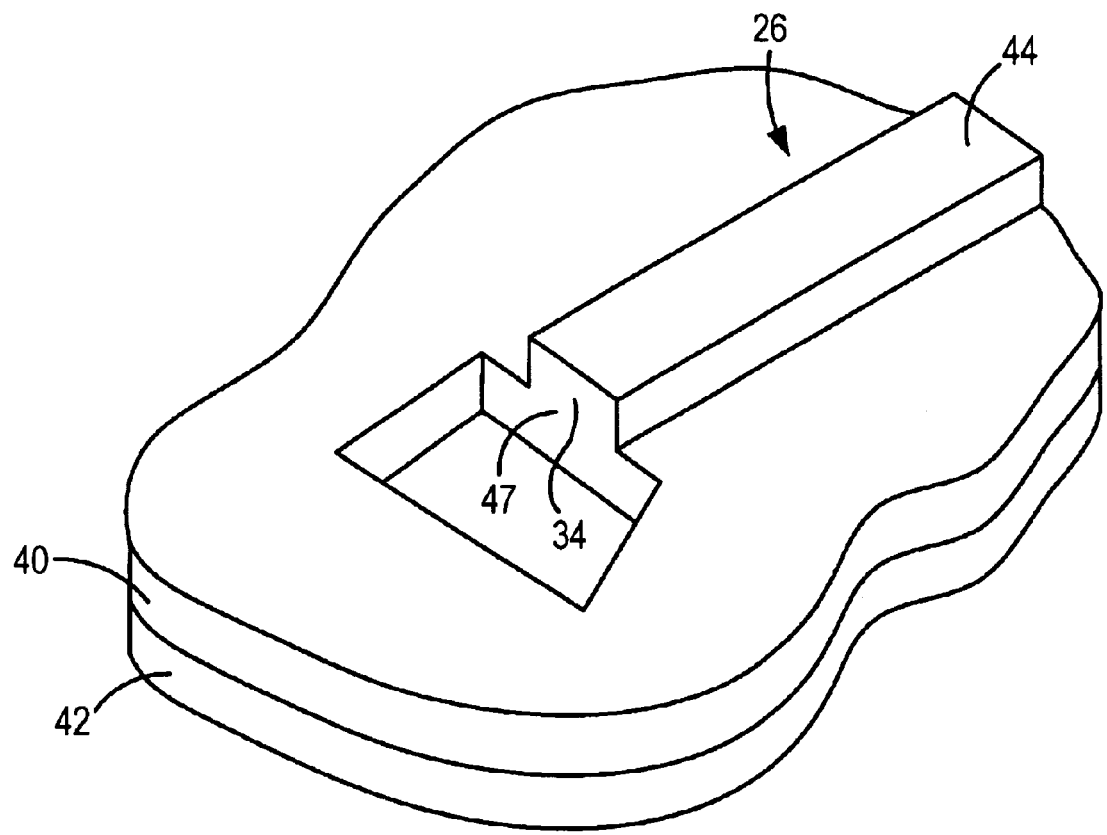
FIG. 3D is a perspective view of a portion of an optical component having a reflector.

FIG. 3D illustrates a suitable construction of a reflector 34 for use with a filter 10 constructed in accordance with FIG. 1B. The reflector 34 includes a reflecting surface 47 positioned at an end of an array waveguide 26. The reflecting surface 47 is configured to reflect light signals from an array waveguide 26 back into the array waveguide 26. The reflecting surface 47 extends below the base of the ridge 44. For instance, the reflecting surface 47 can extend through the light transmitting medium 40 to the base 42 and in some instances can extend into the base 42. The reflecting surface 47 extends to the base 42 because the light signal carrying region 46 is positioned in the ridge 44 as well as below the ridge 44 as shown in FIG. 5E. As a result, extending the reflecting surface 47 below the base 42 of the ridge 44 increases the portion of the light signal that is reflected.

Figure 3E:
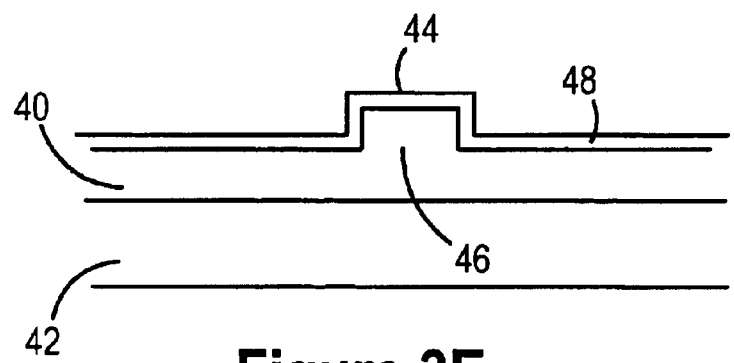
FIG. 3E is a cross section of the component shown in FIG. 3B at any of the lines labeled A when the component includes a cladding layer.

A cladding 48 layer can be optionally be positioned over the light transmitting medium 40 as shown in FIG. 3E. The cladding 48 layer can have an index of refraction less than the index of refraction of the light transmitting medium 40 so light signals from the light transmitting medium 40 are reflected back into the light transmitting medium 40. Because the cladding 48 layer is optional, the cladding 48 layer is shown in some of the following illustrations and not shown in others.

The array waveguides 26 of FIG. 3B are shown as having a curved shape. A suitable curved waveguide is taught in U.S. patent application Ser. No. 09/756,498, filed on Jan. 8, 2001, entitled "An Efficient Curved Waveguide" and incorporated herein in its entirety. Other filter 10 constructions can also be employed. For instance, the principles of the invention can be applied to filters 10 having straight array waveguides 26. Filters 10 having straight array waveguides 26 are taught in U.S. patent application Ser. No. 09/724,175, filed on Nov. 28, 2000, entitled "A Compact Integrated Optics Based Arrayed Waveguide Demultiplexer" and incorporated herein in its entirety.

The array waveguide grating 24 illustrated in FIG. 3B can be controlled so as to change the channel that appears on the output waveguide 16. Each array waveguide 26 includes an effective length tuner 28 for changing the effective length of the array waveguide 26. As will be discussed in more detail below, a variety of effective length tuners 28 can be used in conjunction with the array waveguides 26. For instance, each effective length tuner 28 can be a temperature control device such as a resistive heater. Increasing the temperature of the light transmitting medium 40 causes the index of refraction of the light transmitting medium 40 to increase and accordingly increases the effective length. Alternatively, each effective length tuner 28 can include an electrical contact configured to cause flow of an electrical current through the array waveguide 26. The electrical current causes the index of refraction of the light transmitting medium 40 to decrease and accordingly decreases the effective length. Further, each effective length tuner 28 can include an electrical contact configured to cause formation of an electrical field through the array waveguide 26. The electrical field causes the index of refraction of the light transmitting medium 40 to increase and accordingly increases the effective length.

As noted above, the effective length tuners 28 are configured to change the effective length of each array waveguide 26 by a different amount. Further, the effective lengths are changed so the effective length change differential, δ1, is a constant for adjacent array waveguides 26. Because the array waveguides 26 are often curved the change in effective length is often not uniform across the width of the array waveguide 26. As a result, the change in effective length of an array waveguide 26 can be the change in the effective length averaged across the width of the array waveguide 26.

Figure 4A:
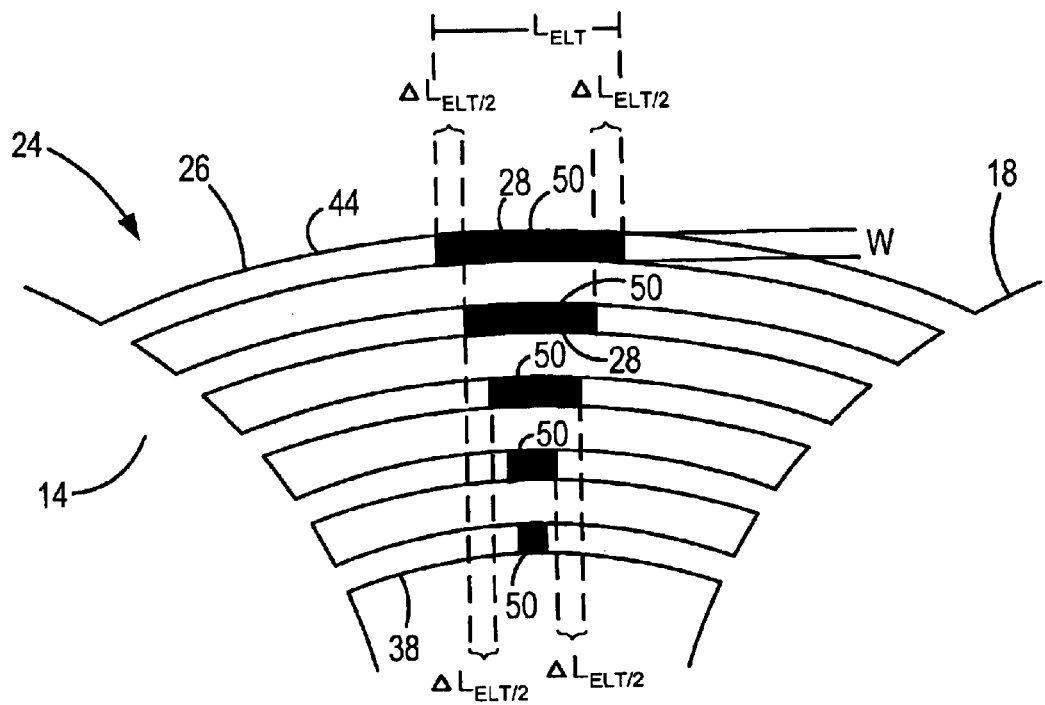
FIG. 4A illustrates a plurality of array waveguides that each include an effective length tuner.

FIG. 4A illustrates one arrangement of effective length tuners 28 that can be engaged so as to provide a constant effective length change differential, δ1. The effective area 50 of each effective length tuner 28 is shown. The effective area 50 of an effective length tuner 28 is the area of the effective length tuner 28 that changes the effective length of the array waveguide 26. Each effective area 50 has an effective area 50 width, W, and an effective area 50 length, $L_{ELT}$. The effective area 50 width, W, is about the same for each array waveguide 26. The effective area 50 length, $L_{ELT}$, is different for each array waveguide 26. As a result, when the effective length tuners 28 are configured so the change in effective length per unit of effective area 50 is about the same for each effective length tuner 28, the change in effective length is different for each array waveguide 26. Although the effective length tuners 28 can be configured so the effective area 50 length, $L_{ELT}$, is consistent across the width of an array waveguide 26, the effective area 50 length, $L_{ELT}$, can also refer to the length of the effective area 50 averaged across the width of the array waveguide 26.

The effective length tuners 28 can be configured so the difference in the effective area 50 lengths, $\Delta L_{ELT}$, is a constant for adjacent array waveguides 26. As a result, when the effective length tuners 28 are configured so the change in effective length per unit of effective area 50 is about the same for each effective length tuner 28, the effective length change differential, δ1, is a constant. As noted above, changing the effective length of the array waveguides 26 such that the effective length change differential, δ1, is a constant changes the value of the effective length differential, ΔL, and accordingly adjusts the location where the channels are incident on the output side 22 of the second light distribution component 18. In some instances, the difference in the effective area 50 lengths, $\Delta L_{ELT}$, is greater than the effective length differential, ΔL.

Figure 4B:
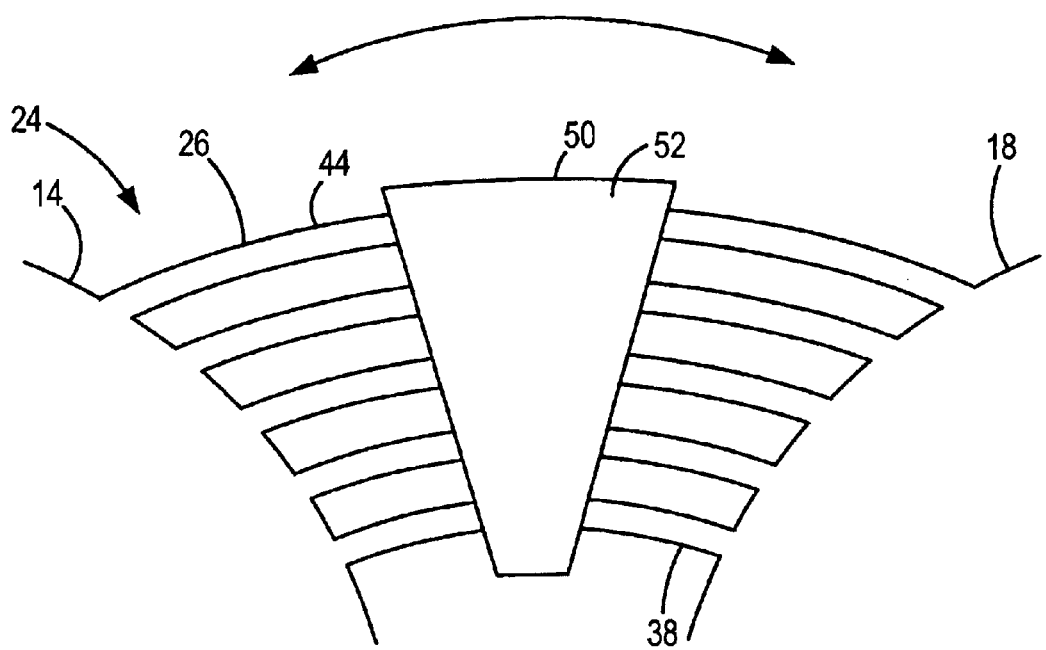
FIG. 4B illustrates a common effective length tuner configured to change the effective length of a plurality of array waveguides.

FIG. 4B illustrates another effective length tuner 28 arrangement that can be operated so as to provide a constant effective length change differential, δ1. The effective length tuner 28 for each array waveguide 26 is incorporated into a common effective length tuner 52 that extends between the array waveguides 26. The common effective length tuner 52 can change the effective length of the portions of the component 36 positioned between the array waveguides 26. The effective area 50 of the common effective length tuner 52 has a substantially wedge shape. The wedge shape is most effective when the array waveguides 26 are arranged so the distance between adjacent array waveguide 26 is substantially constant for different pairs of adjacent array waveguide 26. This arrangement combined with the wedge shape allows the effective area 50 of the common effective length tuner 52 to affect a different length of each array waveguide 26. Further, this arrangement encourages the difference in the average length of adjacent effective areas 50, $\Delta L_{ELT}$, to be substantially a constant. As a result, when the common effective length tuner 52 is engaged, the effective length change differential, δ1, is a constant for adjacent array waveguides 26.

Although not illustrated, one or both sides of the effective area 50 of the common effective length tuner 52 illustrated in FIG. 4B can have a stair step shape. The stair step shape can encourage a consistent effective area 50 length across the width of the array waveguide 26.

The above discussion presumes that a substantially constant $\Delta L_{ELT}$ is preserved. However, when the effective length tuners 28 are configured so the change in effective length per unit of effective area 50 is about the same for each effective length tuner 28, the same result can often be achieved by arranging the effective length tuners 28 so the difference in the effective area 50 for adjacent array waveguides 26 is a constant.

A variety of effective length tuners 28 can be employed with the arrayed waveguide grating 24. A suitable effective length tuner 28 changes the index of refraction of the light transmitting medium 40. When the index of refraction of an array waveguides 26 increases, a longer time is required for the light signal to travel through the array waveguide 26. As a result, the array waveguide 26 is effectively longer. Alternatively, when the index of refraction of an array waveguides 26 decreases, a shorter time is required for the light signal to travel through the array waveguide 26. As a result, the array waveguide 26 is effectively shorter.

The effective length tuners 28 can be temperature control devices 54. The effective length increases as the temperature increases and the effective length decrease as the temperature decreases. Additionally, the amount of change in the effective length can be increased with increased temperatures or decreased with decreased temperatures. More specifically, increasing temperatures increases the change in the effective length differential, ΔL. Further, increasing the portion of an array waveguide 26 adjacent to the temperature control device 54 increases the amount of change in the effective length differential, ΔL.

A suitable temperature control device 54 can provide only heating, only cooling or both. When the temperature control device 54 provides only heating, the temperature control device 54 can be disengaged to reduce the temperature of the array waveguide 26. When the temperature control device 54 provides only cooling, the temperature control device 54 can be disengaged to increase the temperature of the array waveguide 26. The effective area 50 of a temperature control device 54 is the area of the temperature control device 54 positioned adjacent to the array waveguide 26.

Figure 5A:
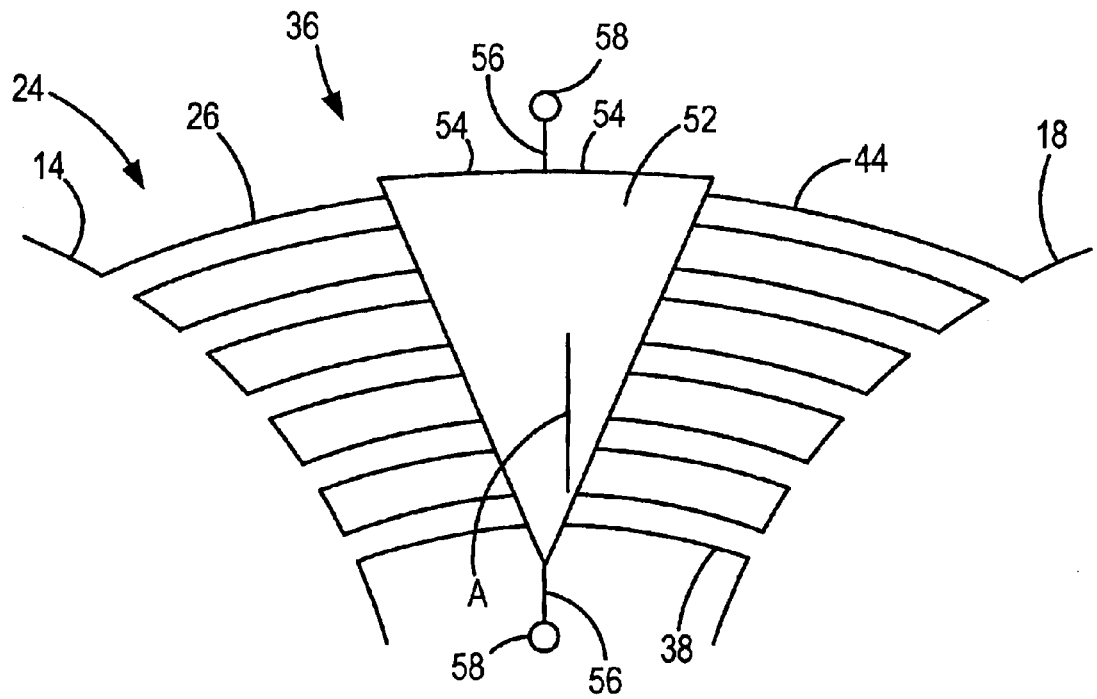
FIG. 5A illustrates a temperature controlled device that serves as a common effective length tuner.
Figure 5B:
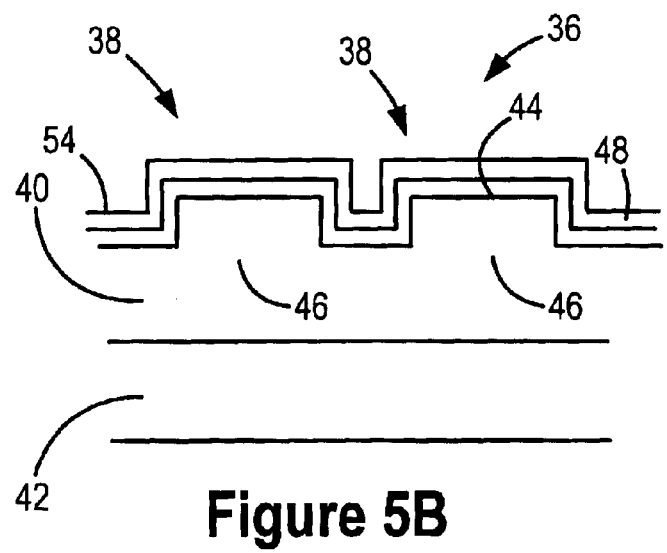
FIG. 5B is a cross section of the component of FIG. 5A taken at the line labeled A.

An example of a temperature control device 54 is a metal layer such as a layer of Cr, Au and NiCr. An electrical current can be flowed through the metal layer so the metal layer acts as resistive heater. FIG. 5A shows a resistive heater configured to act as a common effective length tuner 52 as discussed with respect to FIG. 4B. FIG. 5B is a cross sectional view of FIG. 5A taken at the line labeled A. The resistive heater is formed over plurality of the array waveguides 26. Electrical conductors 56 can be formed on the component 36 to deliver electrical energy to the heater. The electrical conductors 56 are in communication with pads 58 that can be connected to the controller 30 by wires. The resistive heater is configured so the temperature is substantially even across the surface. As a result, the amount of effective length change is about the same per unit of effective area 50 for each resistive heater.

Figure 6B:
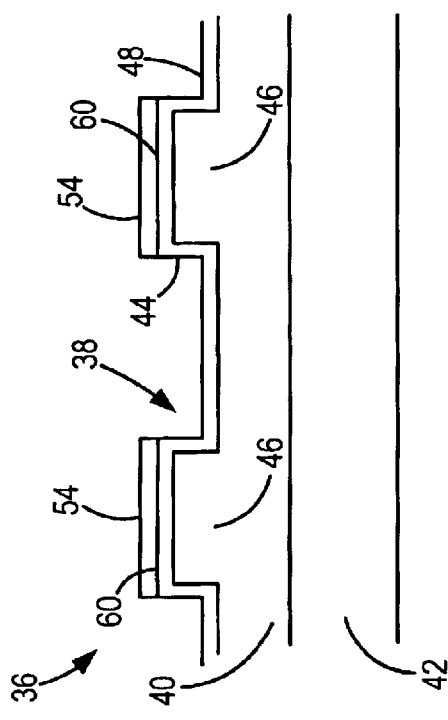
FIG. 6B illustrates a temperature control device positioned over the ridge of an array waveguide.
Figure 6C:
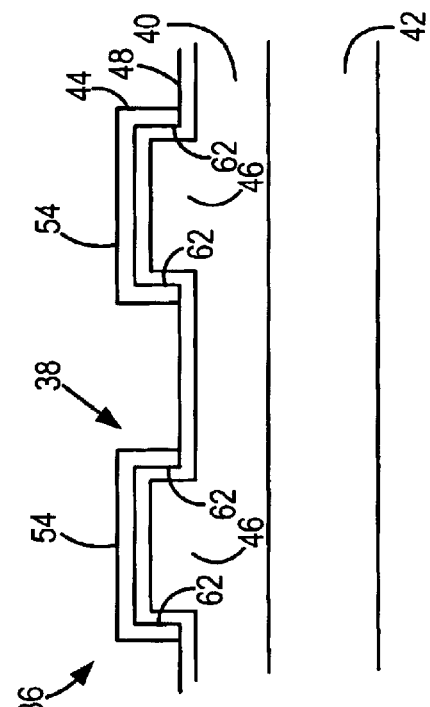
FIG. 6C illustrates a temperature control device positioned adjacent to the sides of the ridge.
Figure 6A:
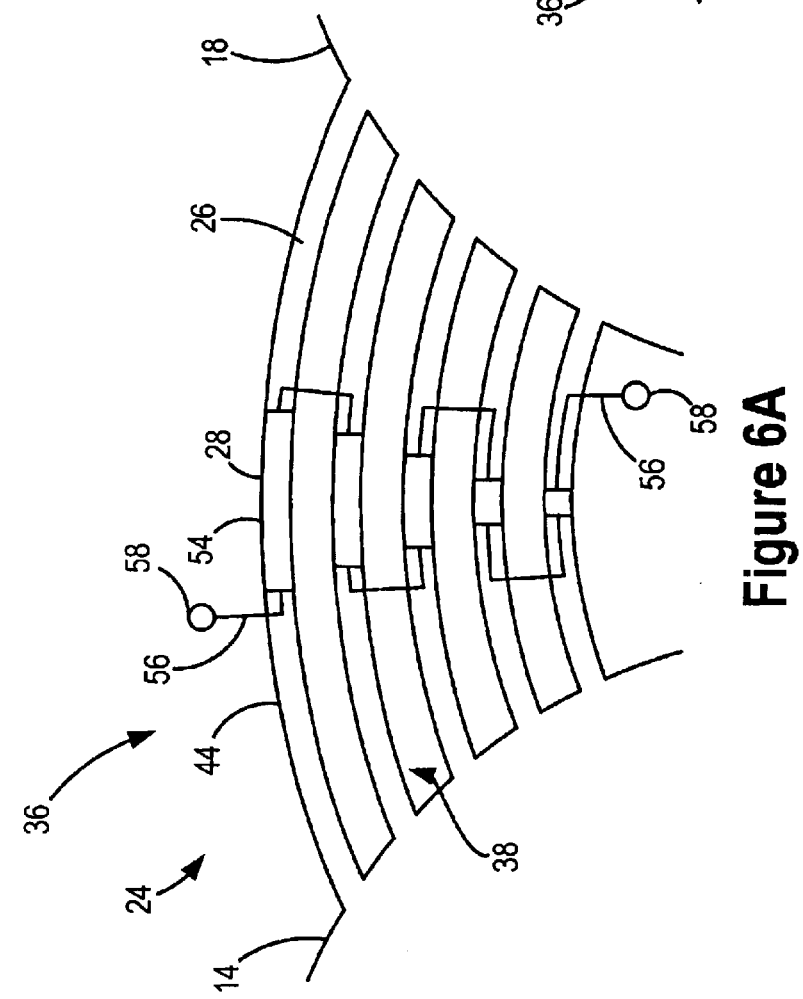
FIG. 6A illustrates a plurality of array waveguides that each include a temperature controlled device as an effective length tuner.

Another suitable arrangement of electrical heaters is illustrated in FIG. 6A. A resistive heater is positioned over the top 60 of the ridge 44 of each array waveguide 26. Each resistive heater can extend across the width of the ridge 44 as shown in FIG. 6B. Although the resistive heater need not extend across the entire width of the ridge 44, extending the resistive heater across the width of the ridge 44 helps preserve the uniformity of change in the index of refraction across the width of the array waveguide 26.

Figure 6D:
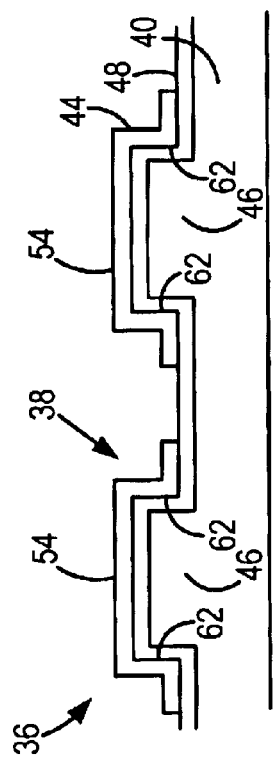
FIG. 6D illustrates a temperature control device positioned adjacent to the sides of the ridge and extending away from the sides of the ridge.

The resistive heater can be positioned adjacent to the sides 62 of the ridge 44 as shown in FIG. 6C in order to increase the portion of the light signal carrying region 46 exposed to the temperature change. Further, the resistive heater can extend away from the sides 62 of the ridge 44 as shown in FIG. 6D. Extending the resistive heater away from the sides 62 of the ridge 44 further increases the portion of the light signal carrying region 46 exposed to the temperature change.

FIG. 6A shows the resistive heaters connected in series by a series of electrical conductors 56. When a potential is applied between the pads 58, a current flow through the resistive heaters. Because the resistive heaters are connected in series, the same current flows through each resistive heater. When the metal layer of each resistive heater has about the same thickness and each resistive heater has the same position relative to the array waveguide 26, the degree of heating per unit of effective area 50 of the resistive heater is about the same for each resistive heater. More specifically, the temperature of each resistive heater is about the same. As a result, the amount of effective length change is about the same per unit of effective area 50 for each resistive heater.

As noted above, the degree of the effective length change increases as the temperature increases. As a result, the temperature of the resistive heaters is controlled in order to tune the filter 10. For instance, when the effective length tuners 28 of FIG. 2A are resistive heaters arranged such that the total change in effective length for the j-th array waveguide 26 is $j*\Delta l$, a higher temperature is needed to make the channel labeled B appear on the output waveguide 16 than is required to make the channel labeled A appear on the output waveguide 16.

When a temperature control device 54 is employed as an effective length tuner 28, Equation 1 can be used to approximate the tuning range, $\Delta\lambda$, of the filter 10. The tuning range is the range of wavelengths over which the filter 10 can be tuned. In Equation 1, $\lambda_1$ is the lowest wavelength in the tuning range. $\Delta n_T$ is the total change in the index of refraction of the light transmitting medium caused by the temperature change. $\Delta n_T$ can be expressed as $dn_T/dT * \Delta T$ where $dn_T/dT$ is the coefficient of thermal expansion of the light transmitting medium 40. The coefficient of thermal expansion measures the change in the index of refraction of the light transmitting medium 40 that occurs with a 1 degree change in temperature. $\Delta T$ is the total temperature change needed for the wavelength tuning range, $\Delta\lambda$.

$$\Delta\lambda = (\Delta n_T * \Delta L_{ELT} * \lambda_1)/(\Delta L) \qquad \text{Equation 1}$$

Equation 1 illustrates that increasing the value of $\Delta L_{ELT}$ can increase the tuning range. Additionally, an increased thermal coefficient increase the tuning range. The thermal coefficient is dependent on the light transmitting medium 40 that is chosen. For example, the thermal coefficient for Silicon is about 0.0002/° C.; polymer is about 0.00018/° C.; for $LiNbO_3$ is about 0.000053/° C.; and for silica is about 0.00001/° C.

In some instances, the temperature of the effective length tuners 28 is used to control the filter 10. The filter 10 can include one or more temperature sensors such as thermocouples in order provide for control of the temperature of the effective length tuners 28. Suitable locations for the temperature sensors include the top 60 or sides 62 of the ridges of the array waveguides 26, the cladding 48 layer, under the effective length tuner 28 or over the effective length tuner 28. The output of the one or more temperature sensors can be monitored by the electronics 32. The electronics 32 can use the output in a feedback control loop in order to keep the effective length tuners 28 and/or the array waveguides 26 at a particular temperature.

When the effective length tuners 28 are temperature control devices 54, the filter 10 can be controlled from calibration data. For instance, the TEC can be employed to hold the filter 10 at a constant temperature. The wavelength and/or channel that appears on the output waveguide 16 can be monitored as the temperature of the temperature controlled devices is changed. The generated data can then be used to determine a relationship between the wavelength (or channel) and the temperature of the temperature control device 54. The relationship can be expressed by a mathematical equation generated by performing a curve fit to the data. Alternatively, the relationship can be expressed in a tabular form.

During operation of the filter 10, the TEC is employed to hold the filter 10 at the temperature at which the calibration data was generated. The relationship is used to identify the temperature associated with the wavelength that is desired to appear on the output waveguide 16. The temperature control device 54(s) are then operated so as to achieve the desired temperature.

When the temperature control device(s) 54 are resistive heaters, calibration data can be generated using the current through the resistive heaters as an alternative to using the temperature of the temperature control devices 54. For instance, the wavelength and/or channel that appears on the output waveguide 16 can be monitored as the current through the resistive heater is changed. The generated data can then be used to determine a relationship between the wavelength (or channel) and the current. During operation of the filter 10, the TEC is employed to hold the filter 10 at the temperature at which the calibration data was generated. The relationship is used to identify the current associated with the wavelength that is desired to appear on the output waveguide 16. The temperature control device 54(s) are then operated at the identified current.

Figure 7A:
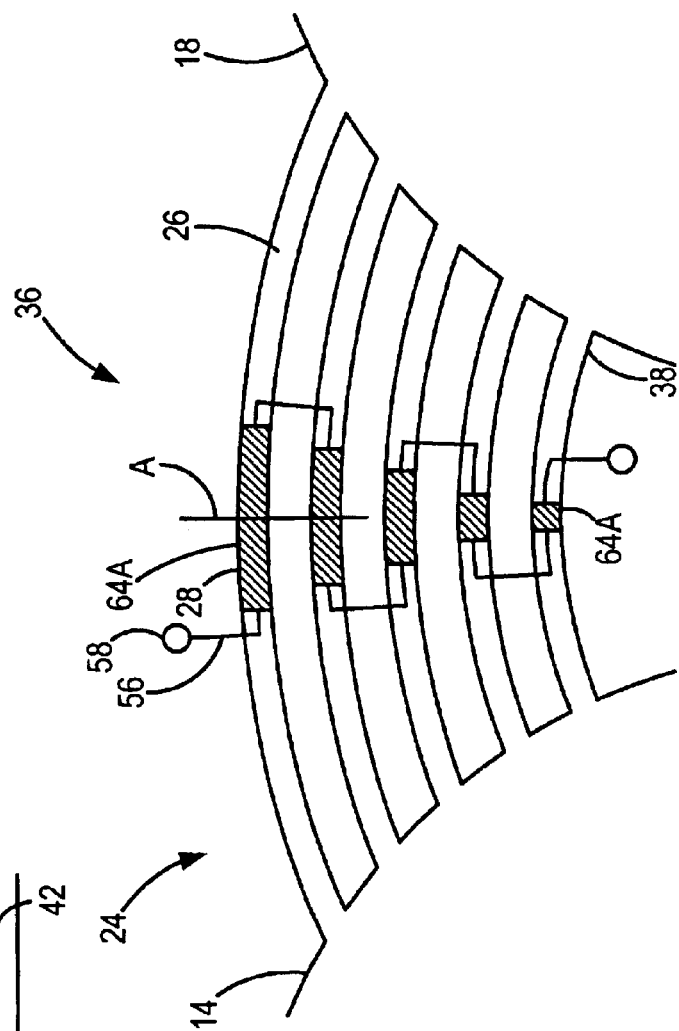
FIG. 7A illustrates a plurality of array waveguides that each include a plurality of electrical contacts that serve as an effective length tuner. Each effective length tuner includes a first electrical contact positioned over a ridge and a second electrical contact positioned under the ridge.
Figure 7B:
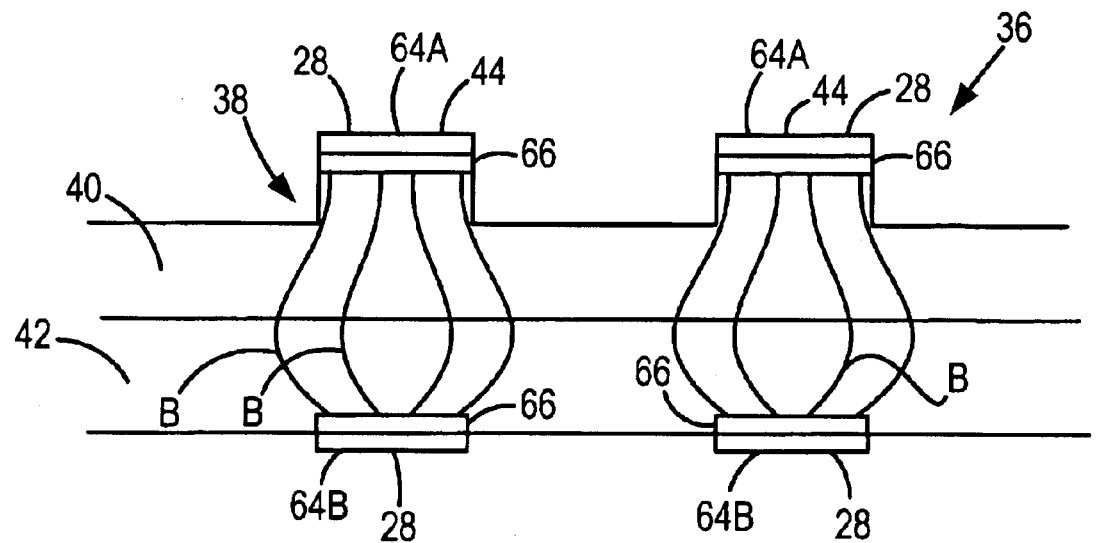
FIG. 7B is a cross section of FIG. 7A taken at the line labeled A.

The effective length tuners 28 can also include a set of electrical contacts. FIG. 7A is a topview of a component 36 having effective length tuners 28 including a first electrical contact and a second electrical contact. FIG. 7B is a cross section of the component 36 shown in FIG. 7A taken at the line labeled A. The effective length tuners 28 include a first electrical contact 64A positioned over the ridge 44 and a second electrical contact 64B positioned under the ridge 44 on the opposite side of the component 36. A doped region 66 is formed adjacent to the first electrical contact 64A and the second electrical contact 64B. The doped regions 66 can be N-type material or P-type material. When one doped region 66 is an N-type material, the other doped region 66 is a P-type material. For instance, the doped region 66 adjacent to the first electrical contact 64A can be a P type material while the material adjacent to the second electrical contact 64B can be an N type material. In some instances, the regions of N type material and/or P type material are formed to a concentration of $10^{(17-21)}/cm^3$ at a thickness of less than 6 µm, 4 µm, 2 µm, 1µm or 0.5 µm. The doped region 66 can be formed by implantation or impurity diffusion techniques.

During operation of the effective length tuner, a potential is applied between the first electrical contact 64A and the second electrical contact 64B. The potential causes the index of refraction of the first light transmitting medium 40 positioned between the first electrical contact 64A and the second electrical contact 64B to change as shown by the lines labeled B. As illustrated by the lines labeled B, the effective area 50 of each effective length tuner 28 is about equal to the portion of the first electrical contact 64A adjacent to the array waveguide 26.

When the potential on the electrical contact adjacent to the P-type material is less than the potential on the electrical contact adjacent to the N-type material, a current flows through the light transmitting medium 40 and the index of refraction decreases. The reduced index of refraction decreases the effective length of the array waveguides 26. When the potential on the index changing element adjacent to the P-type material is greater than the potential on the index changing element adjacent to the N-type material, an electrical field is formed between the index changing elements and the index of refraction increases. The increased index of refraction increases the effective length of the array waveguide 26. As a result, the controller 30 can change from increasing the effective length of the array waveguides 26 to decreasing the effective length of the array waveguides 26 by changing the polarity on the first electrical contact 64A and the second electrical contact 64B.

Increasing the potential applied between the first electrical contact 64A and the second electrical contact 64B increases the amount of effective length change. For instance, when the effective length tuner 28 is being employed to increase the effective length of an array waveguide 26, increasing the potential applied between the first electrical contact 64A and the second electrical contact 64B further increases the effective length of the array waveguide 26. Additionally, increasing the size of the first electrical contact 64A serves to cover a larger area of the array waveguides 26 can increase the amount of effective length change although a larger potential may be required.

Each of the first electrical contacts 64A and the second electrical contacts 64B can be connected in series as shown in FIG. 7A. The doped regions 66 need not extend under the electrical conductor 56 connecting the electrical contacts. Connecting the first electrical contacts 64A in series causes the amount of current flow per unit of effective area 50 of first electrical contact 64A to be about the same for each set of electrical contacts. As a result, the amount of effective length change per unit of effective area 50 is about the same for each first electrical contact 64A.

As noted above, the degree of the effective length change increases as the applied potential increases. As a result, the applied potential is controlled so as to tune the filter 10. For instance, when the effective length tuners 28 of FIG. 2A include a first electrical contact 64A and a second electrical contact 64B arranged such that the total change in effective length for the j-th array waveguide 26 is j*Δl, a higher potential is needed to make the channel labeled B appear on the output waveguide 16 than is required to make the channel labeled A appear on the output waveguide 16.

When the effective length tuners 28 include electrical contacts, Equation 2 can be used to determine the tuning range, Δλ, of the filter 10. In Equation 2, $\lambda_1$ is the lowest wavelength in the tuning range, $\Delta n_E$ is the total change in the index of refraction of the light transmitting medium that results from the current injection or the applied electrical field change. $\Delta n_E$ can be expressed as $dn_E/dN * \Delta N$ where $\Delta N$ is the total carrier density change needed for the tuning range Δλ and $dn_E/dN$ measures the change in the index of refraction of the light transmitting medium 40 that occurs per unit of carrier density change. Equation 2 illustrates that increasing the value of $\Delta L_{ELT}$ can increase the tuning range. Additionally, increasing $\Delta n_E$, $dn_E/dN$ or $\Delta N$ can increase the tuning range.

$$\Delta\lambda=(\Delta n_E * \Delta L_{ELT} * \lambda_1)/(\Delta L) \qquad 2$$

The tuning range of effective length tuners 28 that include electrical contacts can be limited by free carrier absorption that develops when higher potentials are applied between the first electrical contact 64A and the second electrical contact 64B. Free carrier absorption can cause optical loss. Increasing $\Delta L_{ELT}$ can increase the tuning range without encouraging free carrier issues. Additionally, choosing a light transmitting medium 40 with an index of refraction that is highly responsive to current or electrical fields can also improve the tuning range.

Figure 7C:
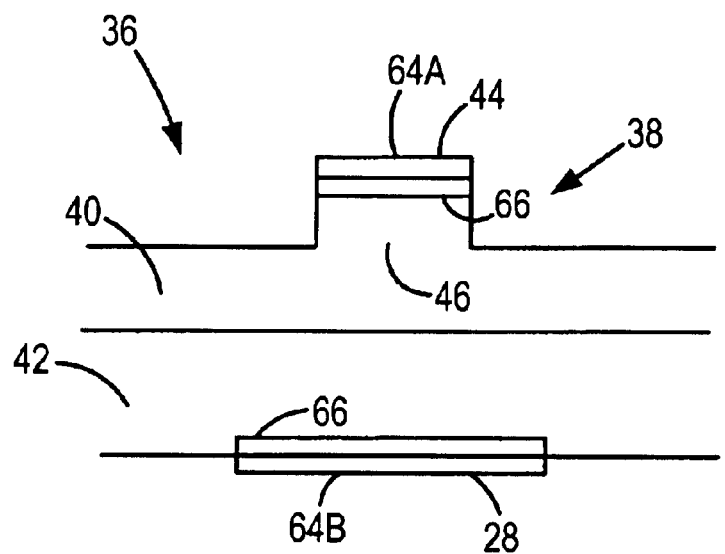
FIG. 7C illustrates a component having a cladding layer positioned over the light transmitting medium.

The second electrical contact 64B can have about the same width as the first electrical contact 64A as shown in FIG. 7B. Alternatively, the second electrical contact 64B can have a width that is greater than the width of the first electrical contact 64A as shown in FIG. 7C. The additional width of the second electrical contact 64B can help to distribute the region where the index of refraction changes more evenly through the light signal carrying region 46.

Figure 8A:
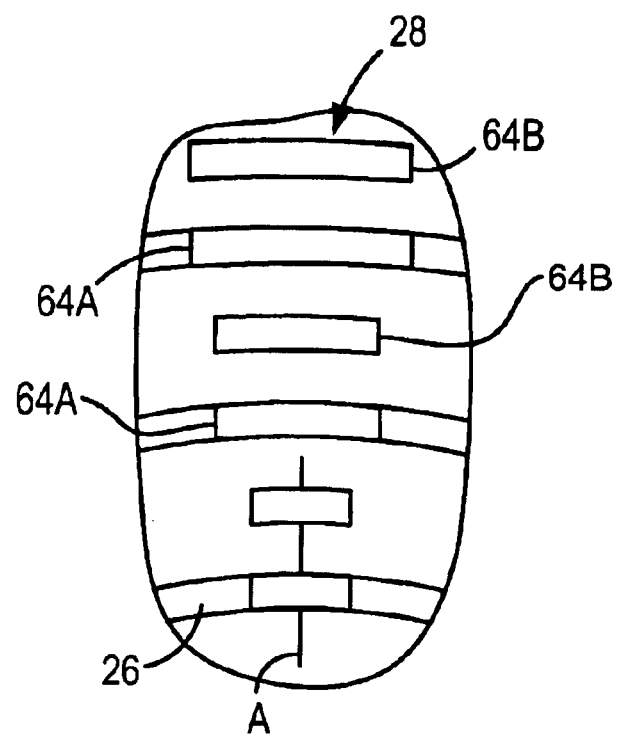
FIG. 8A illustrates a plurality of array waveguides that each include a plurality of electrical contacts that serve as an effective length tuner. Each effective length tuner includes a first electrical contact positioned over a ridge and a second electrical contact positioned adjacent to a side of the ridge.
Figure 8B:
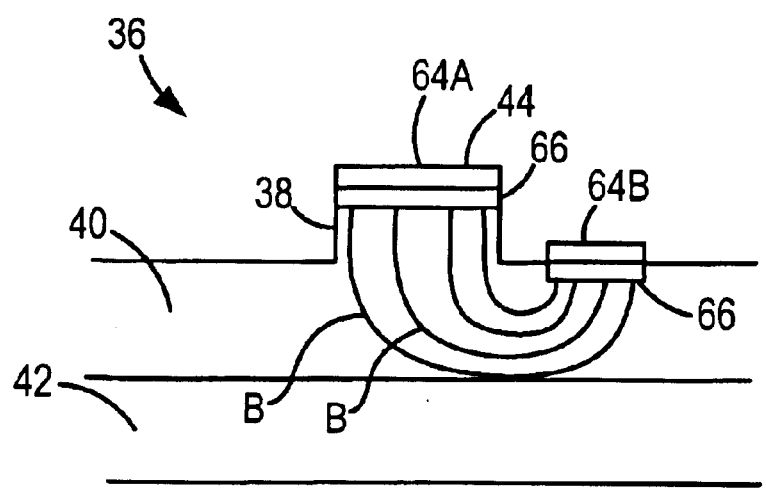
FIG. 8B is a cross section of the component shown in FIG. 8A taken at the line labeled A.

The second electrical contact 64B need not be positioned under the ridge 44 as shown in FIG. 8A through FIG. 5B. FIG. 8A is a topview of a component 36 having first electrical contact 64A positioned over the ridges 44 of the array waveguides 26 and FIG. 8B is a cross section of the component 36 of FIG. 8A taken at the line labeled A. This arrangement causes the index of refraction to be changed in the region indicated by the lines labeled B.

FIG. 9A and FIG. 9B show the first electrical contact 64A and the second electrical contact 64B configured to act as common effective length tuner 52 as discussed above in respect to FIG. 4B. FIG. 9A is a topview of a component 36 having a first electrical contact 64A extending over a plurality of the array waveguides 26 and FIG. 9B is a cross section of FIG. 9A taken at the line labeled A. Although the shape of the second electrical contact 64B is not illustrated, the second electrical contact 64B can have a shape that mirrors the shape of the first electrical contact 64A. The dimensions of the second electrical contact 64B need not be the same as the dimensions of the first electrical contact 64A. For instance, the second electrical contact 64B can have larger dimensions than the first electrical contact 64A while retaining a shape that mirrors the first electrical contact 64A. The doped regions 66 are formed under the entire first electrical contact 64A and the entire second electrical contact 64B.

The first electrical contact 64A has a wedge shape. Although not illustrated, one or both sides of the wedge can have a stair step shape. The stair step shape can encourage a consistent effective area 50 length across the width of the array waveguide 26.

The first electrical contact 64A and the second electrical contact 64B can also serve as a temperature controlled device. For instance, the doped regions 66 can be eliminated. When enough potential is applied between the first electrical contact 64A and the second electrical contact 64B, a current will flow through the light transmitting medium 40 and increase the temperature of the light transmitting medium 40. Accordingly, the electrical contacts can serve as a heater.

When the effective length tuners 28 include electrical contacts, the filter 10 can be controlled from calibration data. For instance, the TEG can be employed to hold the filter 10 at a constant temperature. The wavelength and/or channel that appears on the output waveguide 16 is monitored as the potential on the first electrical contact 64A and the second electrical contact 64B is changed. The generated data is used to determine a relationship between the wavelength (or channel) and the applied potential. The relationship can be expressed by a mathematical equation generated by performing a curve fit to the data. Alternatively, the relationship can be expressed in a tabular form.

During operation of the filter 10, the TEC is employed to hold the filter 10 at the temperature at which the calibration data was generated. The relationship is used to identify the potential associated with the wavelength that is desired to appear on the output waveguide 16. The effective length tuners 28 are then operated at the desired potential.

The effective length tuners 28 need not be constructed to produce a change in effective length per unit of effective area 50 that is about the same for each effective length tuner 28. For instance, the controller 30 can independently control each effective length tuner 28. The controller 30 can control the effective length tuners 28 so different effective length tuners 28 have a different change in effective length per unit of effective area 50. For instance, when the effective length tuners 28 are temperature controlled devices the controller 30 can control the effective length tuners 28 so different effective length tuners 28 have different temperatures. As a result, the constant $\Delta L_{ELT}$ need not be retained. For instance, each effective length tuner 28 can have about the same effective area 50. In order to preserve the constant $\Delta L$, effective length tuners 28 where a larger change in effective length is needed are increased to higher temperatures than effective length tuners 28 where a lower change in effective length is needed.

When the effective length tuners 28 include sets of electrical contacts, the controller 30 can control the effective length tuners 28 so a different amount of current flows through different effective length tuners 28. As a result, the constant $\Delta L_{ELT}$ need not be retained. For instance, each effective length tuner 28 can have about the same effective area 50. However, effective length tuners 28 where a larger change in effective length is needed to preserve a constant $\Delta L$ can be operated at higher currents than effective length tuners 28 where a lower change in effective length is needed.

FIG. 10A through FIG. 10E illustrate component 36 constructions that can increase isolation of adjacent array waveguides 26. This isolation is often desired due to the close proximity of the array waveguides 26. The close proximity can permit the electrical or thermal effects in one array waveguide 26 to influence the performance of adjacent array waveguides 26. The close proximity can permit the electrical or thermal effects in one array waveguide 26 to influence the performance of adjacent array waveguides 26 and can also reduce the power consumption. For instance, when thermal energy flows freely through the light transmitting medium 40, temperature changes to one array waveguide 26 can flow through the light transmitting medium 40 and affect the temperature of adjacent array waveguides 26. Silicon has a thermal conductivity is about 1.5W/cm*° C. while silica has a thermal conductivity of about 0.014W/cm*° C. Accordingly, thermal energy flows more freely through silicon than it does through silica.

Figure 10A:
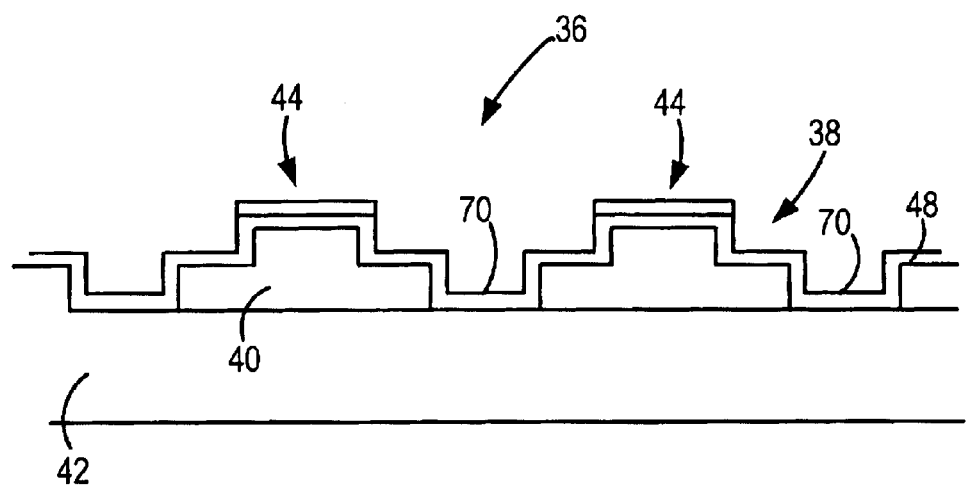
FIG. 10A illustrates a component having a plurality of array waveguides defined in a light transmitting medium positioned over a base. An isolation groove extending through the light transmitting medium is positioned between adjacent array waveguides.

FIG. 10A illustrates array waveguides 26 having an isolation groove 70 positioned between adjacent array waveguides 26. The isolation groove 70 extends through the light transmitting medium 40 to the base 42. The isolation groove 70 effectively increases the distance that thermal or electrical energy must travel from one array waveguide 26 in order to affect another array waveguide 26. Although the isolation groove 70 is illustrated as extending through the light transmitting medium 40, the isolation groove 70 can extend only part way through the light transmitting medium 40.

Figure 10B:
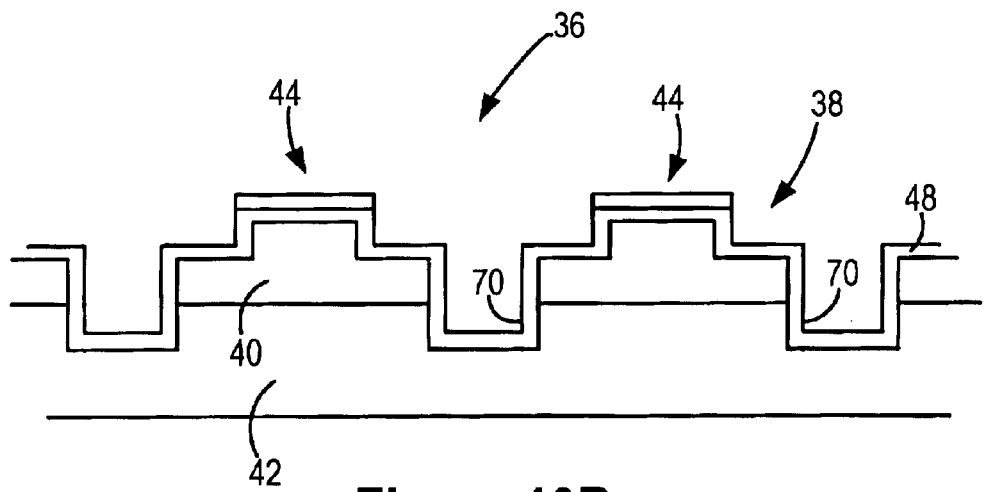
FIG. 10B illustrates the isolation groove extending into the base.

FIG. 10B illustrate an embodiment of array waveguides 26 having an isolation groove 70 extends through the light transmitting medium 40 and into the base 42. As a result, the length of the path available for energy to travel between array waveguides 26 is further increased above the path length of the embodiment shown in FIG. 10A. Increasing this path length increase the degree of isolation between the array waveguides 26.

Figure 10C:
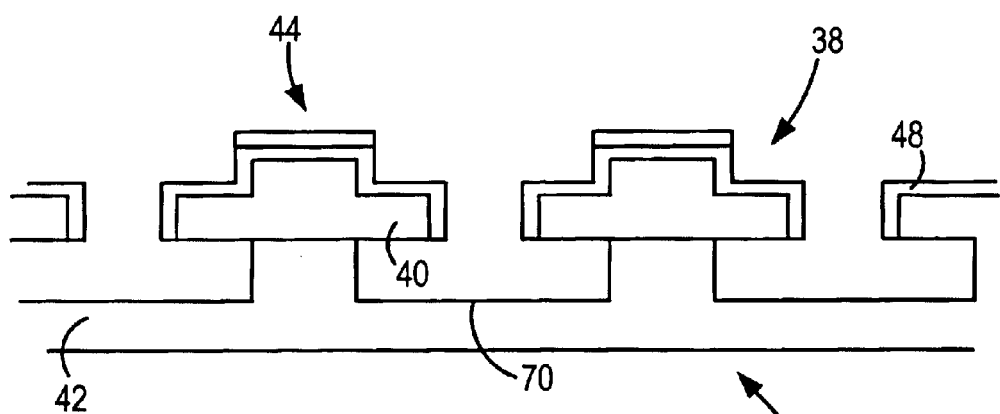
FIG. 10C illustrates the isolation groove undercutting the array waveguides.

FIG. 10C illustrate another embodiment of array waveguides 26 having an isolation groove 70 extends through the light transmitting medium 40 and into the base 42. The isolation groove 70 undercuts the light transmitting medium 40. The undercut reduces the size of the path that is available for thermal or electrical energy to travel from one array waveguide 26 into another array waveguide 26 from the size of the available path in FIG. 10B.

Figure 10D:
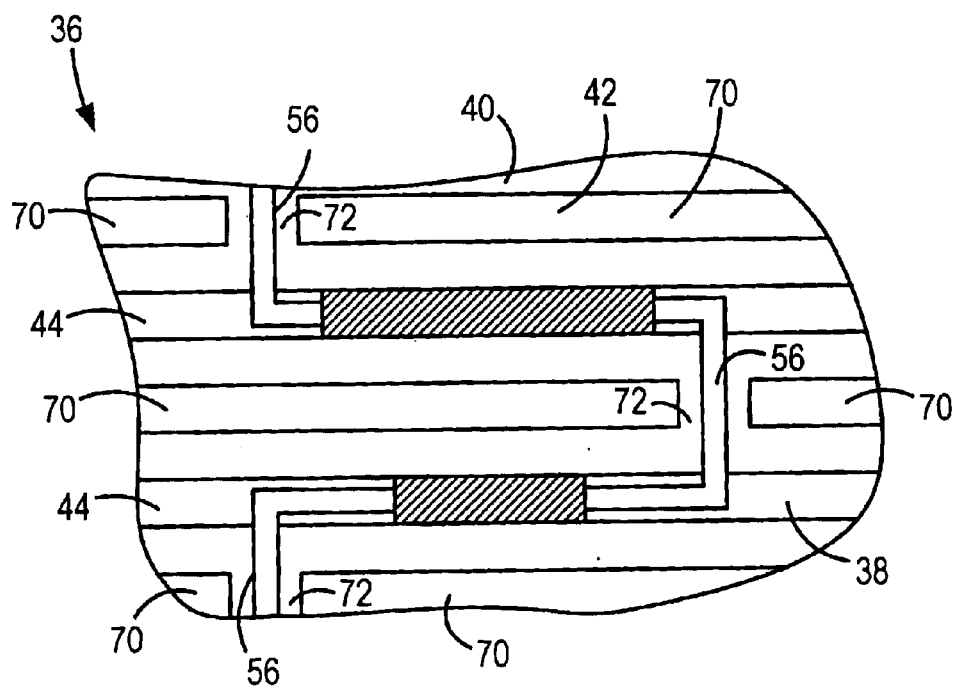
FIG. 10D is a topview of a component having bridge regions that each bridge an isolation groove. Electrical conductors are formed on the bridge region.
Figure 10E:
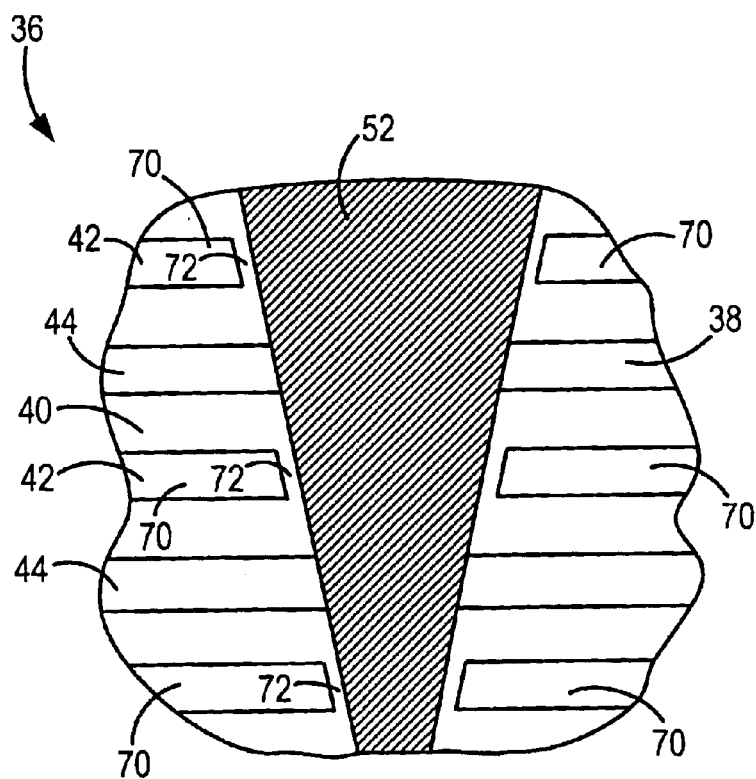
FIG. 10E is a topview of a component having a bridge region that supports a wedge shaped common effective length tuner.

FIG. 10D is a topview of the components 36 shown in FIGS. 10A through 10C when each array waveguide 26 includes an effective length tuner 28. A bridge region 72 bridges the isolation groove 70 between adjacent array waveguides 26. The electrical conductor 56 is formed on the bridge region 72. Accordingly, the bridge region 72 prevents the need to form the electrical conductor 56 in the isolation groove 70. FIG. 10E is a topview of the component 36 shown in FIG. 10A through FIG. 10C when the effective length tuners 28 are incorporated into a common effective length tuner 52 positioned adjacent to more than one array waveguide 26. The bridge region 72 is constructed so as to support a wedge shaped common effective length tuner 52.

The bridge region 72 can be eliminated when electrical conductors 56 do not need to be formed between adjacent array waveguides 26. For instance, when the effective length tuners 28 are independently controlled the electrical conductors 56 can directly connect each effective length tuner 28 to the controller 30. As a result, there is no need for electrical conductors 56 to connect adjacent effective length tuners 28 and the bridge region 72 can be eliminated.

The isolation grooves can also reduce the amount of cross talk associated with the component. A common source of cross talk is light signals exiting the light signal carrying region of one waveguide and entering another waveguide. Positioning the isolation grooves between waveguides can prevent the light signals from entering other waveguides.

Figure 11A:
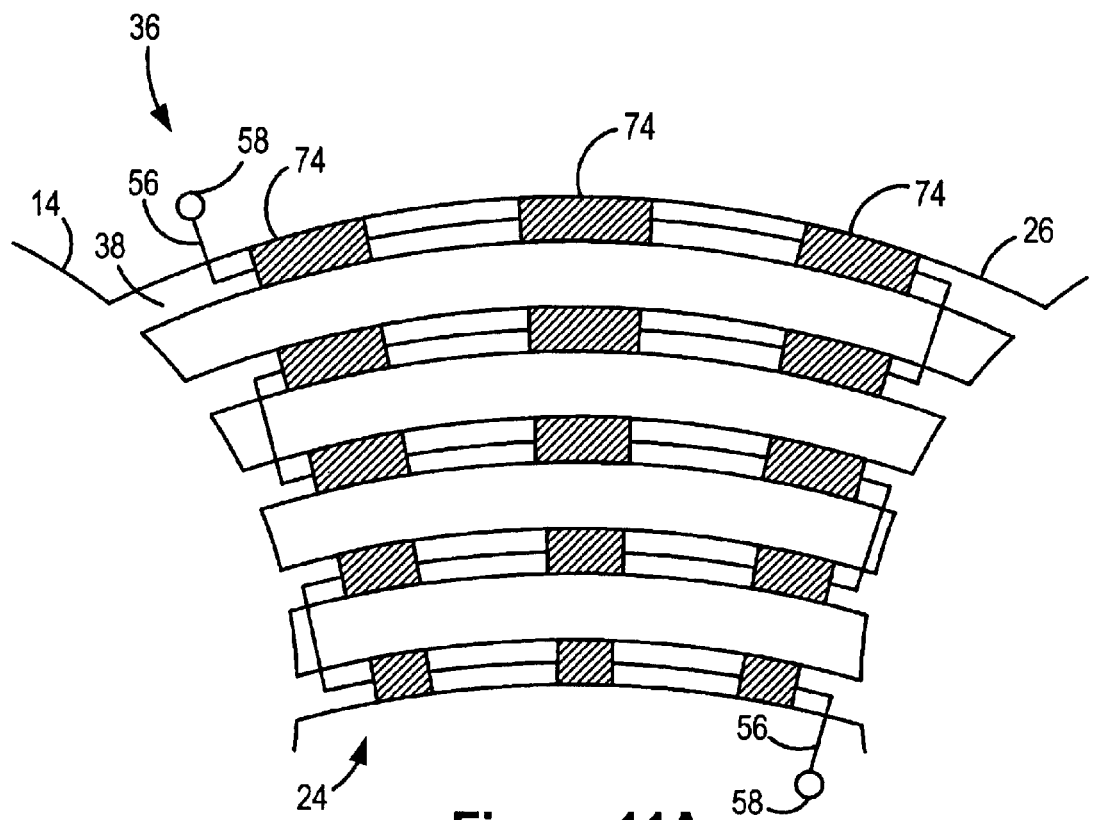
FIG. 11A illustrates an effective length tuner broken into a plurality of sub effective length tuners. The sub effective length tuners are connected in series with the sub effective length tuners on an array waveguide directly connected to one another.

An effective length tuner 28 can be broken into a plurality of sub-effective length tuners 74 as shown in FIG. 11A. The electrical conductors 56 connect the sub-effective length tuners 74 in series. Breaking the effective length tuners 28 into smaller portions can increase the isolation between adjacent array waveguides 26 because each sub-effective length tuner 74 affects a smaller region of the component 36 that does an effective length tuner 28. Although each of the array waveguide 26 is shown as having the same number of sub-effective length tuners 74, different array waveguides 26 can have different numbers of effective length tuners 28. For instance, the shortest array waveguides 26 can have a single sub-effective length tuner 74.

Figure 11B:
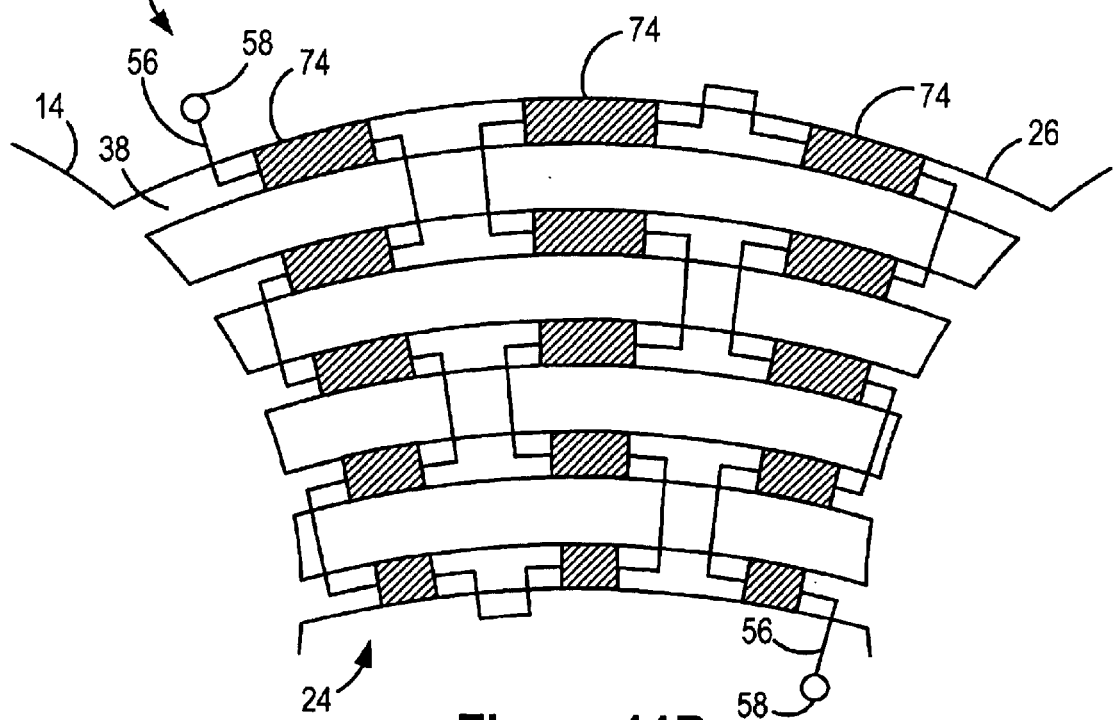
FIG. 11B illustrates an effective length tuner broken into a plurality of sub effective length tuners. The sub effective length tuners are connected in series with the sub effective length tuners on adjacent array waveguide directly connected to one another.

FIG. 11B illustrates another embodiment of the sub effective length tuners connected in series. The sub effective length tuners each connect sub effective length tuners on adjacent array waveguides. This arrangement can provide an improved thermal or electrical uniformity across the lengths of the array waveguides.

Figure 11C:
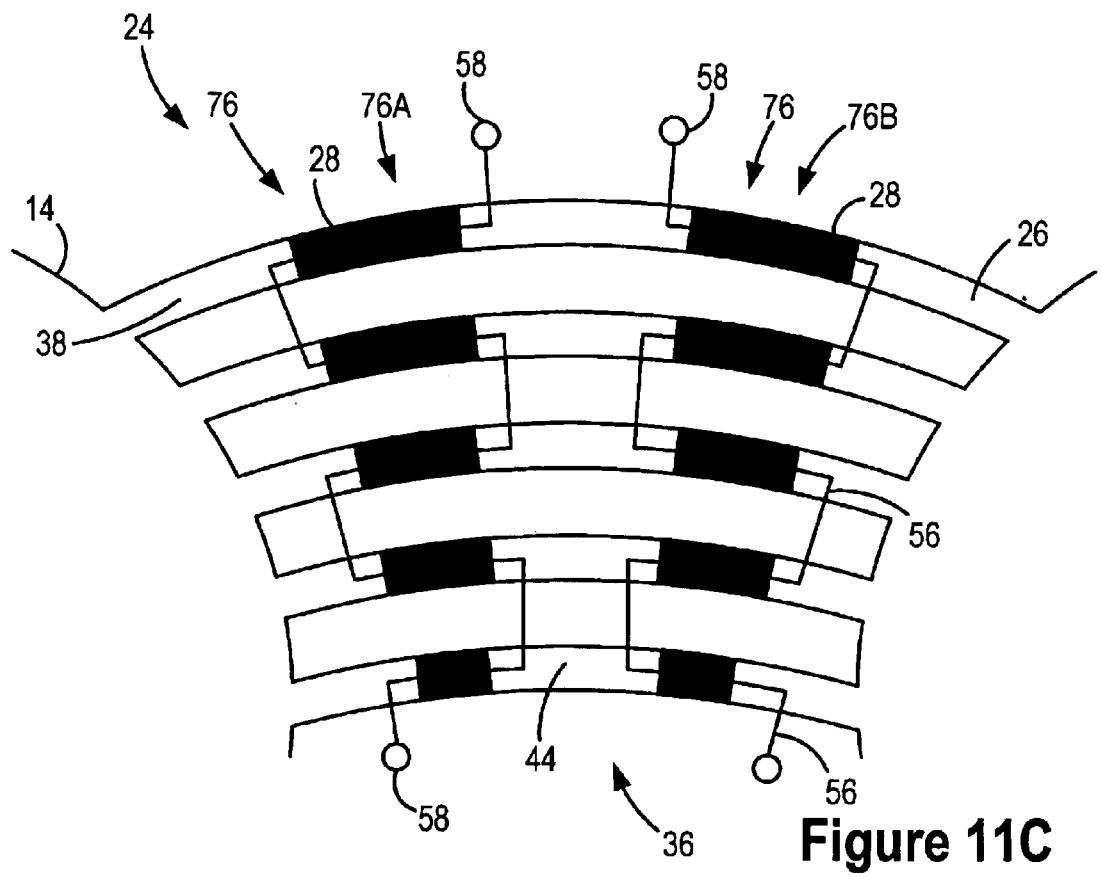
FIG. 11C illustrates an embodiment of a filter having array waveguides with more than one effective length tuner.

The array waveguides 26 can each include more than one effective length tuner 28 as shown in FIG. 11C. The effective length tuners 28 are operated in groups 76. For instance, the effective length tuners 28 of a first group 76A are connected in series and the effective length tuners 28 of a second group 76B are connected in series. The groups 76 can be operated independently of one another. For instance, the effective length tuners 28 of the first group 76A can be operated while the effective length tuners 28 of the second group 76B remain dormant. Once the effective length tuners 28 of the first group 76A do not provide sufficient tuning range, the effective length tuners 28 of the second group 76B can be operated so as to provide additional tuning range. This method of operation can reduce the power requirements of the filter 10. Further, the effective length tuners can be configured such that different groups have different wavelength tuning ranges. For example, an effective length tuner 28 from the first group 76A and an effective length tuner 28 from the second group 76B positioned on the same array waveguide can have different effective area 50 lengths. The group that is employed during tuning can be the group that has the desired tuning range or both groups can be operated together.

Figure 11D:
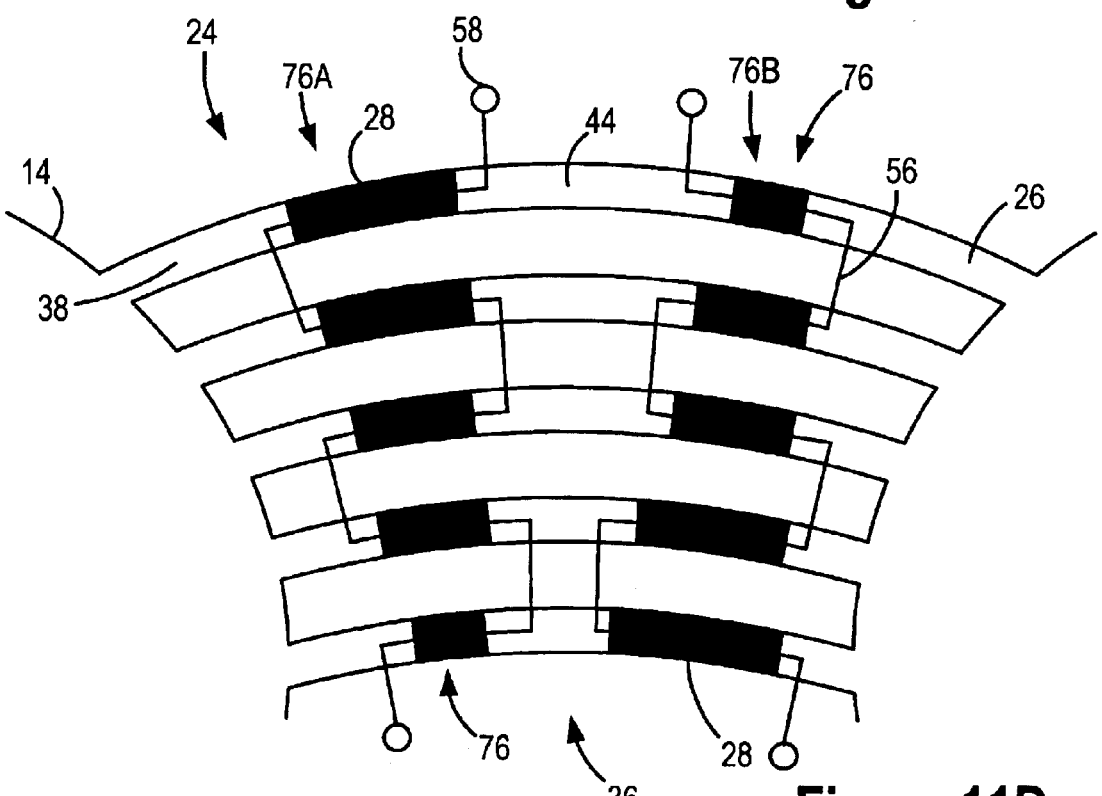
FIG. 11D illustrates an embodiment of a filter having array waveguides with more than one effective length tuner. One group of effective length tuners is configured to move the channels in one direction relative to the output waveguides of the filter while another group of the effective length tuners is configured to move the channels in the opposite direction.

The second group 76B can be inverted relative to the first group 76A as shown in FIG. 11D. As a result, operating one group 76 can increase the effective length differential while the other group 76 lowers the effective length differential. This arrangement can provide an increased tuning speed. For instance, when all the effective length tuners 28 are resistive heaters, engaging the resistive heaters of the first group 76A causes the effective length differential, ΔL, to increase. However, when it is desired to reverse the increase in the effective length differential, ΔL, the resistive heaters of the first group 76A generally must be allowed to cool to the desired temperature. As an alternative to waiting for the resistive heaters of the first group 76A to cool, the resistive heaters of the second group 76B can be engaged to reduce the effective length differential, ΔL.

Figure 11E:
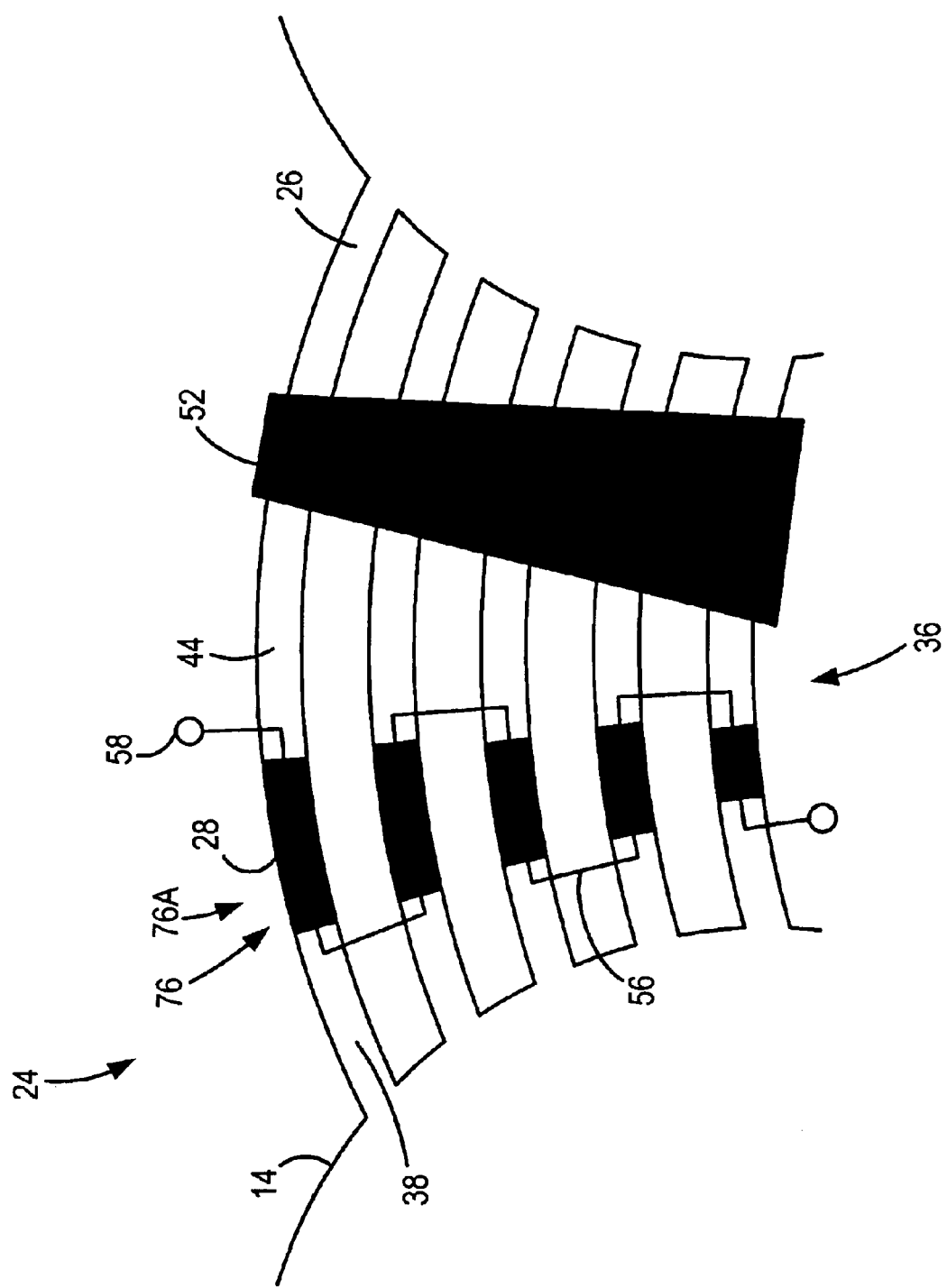
FIG. 11E illustrates an embodiment of the filter having more than one type of effective length tuner.

The array waveguide grating 24 can include more than one type of effective length tuner 28. For instance, FIG. 11E illustrates an array waveguide grating 24 having a first group 76A of effective length tuners 28 including temperature controlled devices and a common effective length tuner. The common effective length tuner can include electrical contacts or a temperature control device. The first group 76A and the second group 76B can be operated independently or in conjunction so as to optimize the performance of the filter 10. For instance, the second group 76B can be operated until the effects of free carrier absorption are evident. The first group 76A can then be engaged to provide additional tuning range.

For the purposes of illustration, the second group 76B is shown as inverted relative to the first group 76A. When the first group 76A is operated so as to increase the temperature, the effective length of the array waveguides 26 increases causing the effective length differential, ΔL, to increase. When the second group 76B is operated so an electrical current flows between the first electrical contact 64A and second electrical contact 64B, the effective length of the array waveguides 26 decreases. Because the second group 76B is inverted relative to the first group 76A, decreasing the effective length of the array waveguides 26 also causes the effective length differential to increase. As a result, when the first group 76A and the second group 76B are concurrently operated as described, they can increase the tuning range by acting together to increase the effective length differential.

The need to invert the second group 76B relative to the first group 76A can be eliminated by operating the effective length tuners 28 of the first group 76A so as to reduce the temperature or by operating the second group 76B so an electrical field is formed. Alternatively, there are circumstances where it is desired for the different groups 76 to be operated so as to have opposing effects on the effective length differential as explained in conjunction with FIG. 11D.

Although not illustrated, the effective length turners 28 can include a temperature control device 54 positioned over an electrical contact. This arrangement can provide an increased tuning range over what could be achieved with either type of effective length tuner 28 alone. When the temperature controlled device is a resistive heater, an electrical insulator can be positioned between the electrical contact and the resistive heater.

Figure 12A:
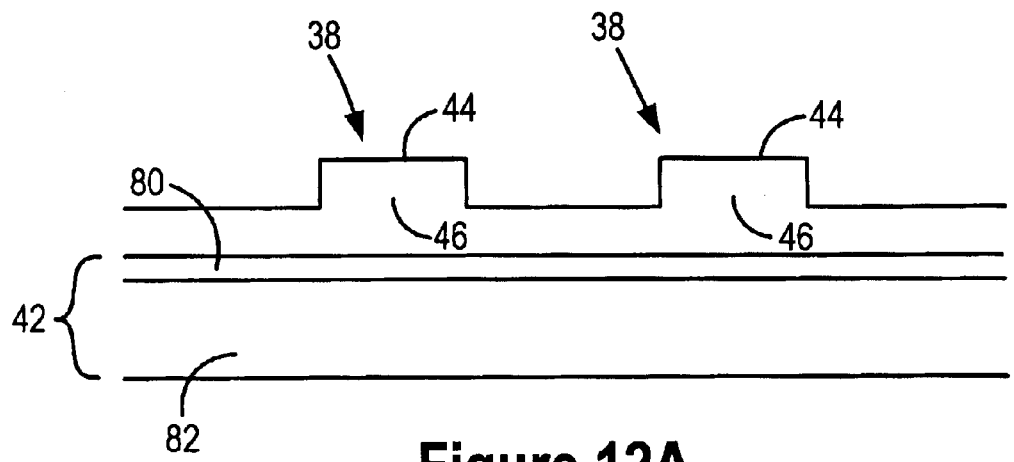
FIG. 12A illustrates a component construction having a light transmitting medium positioned over a light barrier.

The base 42 can have a variety of constructions. FIG. 12A illustrates a component 36 having a base 42 with a light barrier 80 positioned over a substrate 82. The light barrier 80 serves to reflect the light signals from the light signal carrying region 46 back into the light signal carrying region 46. Suitable light barriers 80 include material having reflective properties such as metals. Alternatively, the light barrier 80 can be a material with a different index of refraction than the light transmitting medium 40. The change in the index of refraction can cause the reflection of light from the light signal carrying region 46 back into the light signal carrying region 46. A suitable light barrier 80 would be silica when the light carrying medium and the substrate 82 are silicon. Another suitable light barrier 80 would be air or another gas when the light carrying medium is silica and the substrate 82 is silicon. A suitable substrate 82 includes, but is not limited to, a silicon substrate 82.

Figure 12B:
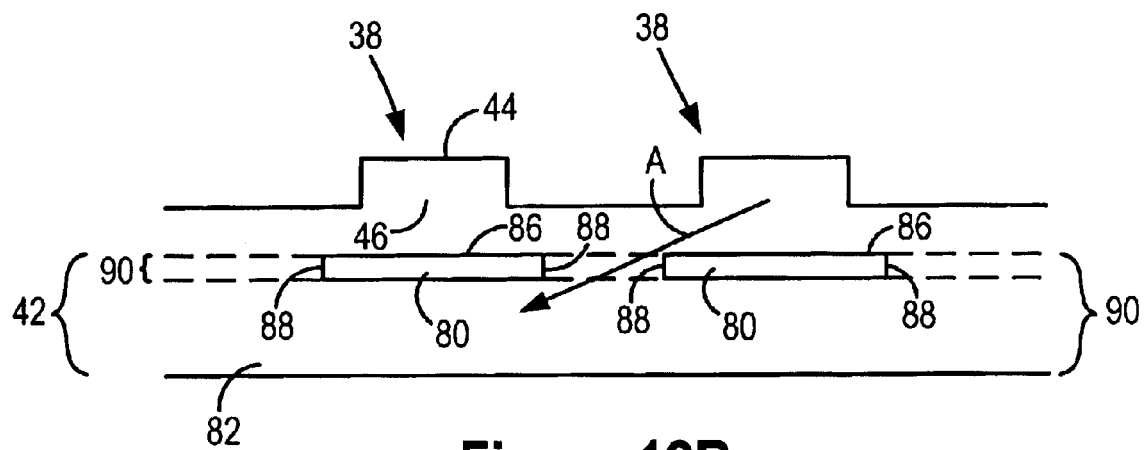
FIG. 12B illustrates a component construction having a light barrier with a surface positioned between sides. A waveguide is defined adjacent to the surface of the light barrier and a light transmitting medium is positioned adjacent to the sides of the light barrier.

The light barrier 80 need not extend over the entire substrate 82 as shown in FIG. 12B. For instance, the light barrier 80 can be an air filled pocket formed in the substrate 82. The pocket 84 can extend alongside the light signal carrying region 46 so as to define a portion of the light signal carrying region 46.

In some instances, the light signal carrying region 46 is adjacent to a surface 86 of the light barrier 80 and the light transmitting medium 40 is positioned adjacent to at least one side 88 of the light barrier 80. As a result, light signals that exit the light signal carrying region 46 can be drained from the waveguide 38 as shown by the arrow labeled A. These light signals are less likely to enter adjacent array waveguide 26. Accordingly, these light signals are not a significant source of cross talk.

The drain effect can also be achieved by placing a second light transmitting medium 90 adjacent to the sides 88 of the light barrier 80 as indicated by the region below the level of the top dashed line or by the region located between the dashed lines. The drain effect is best achieved when the second light transmitting medium 90 has an index of refraction that is greater than or substantially equal to the index of refraction of the light transmitting medium 40 positioned over the base 42. In some instances, the bottom of the substrate 82 can include an anti reflective coating that allows the light signals that are drained from a waveguide 38 to exit the component 36.

When the component 36 includes isolation grooves 70, the isolation grooves 70 can be spaced apart from the sides 88 of the light barrier 80. For instance, the second light transmitting medium 90 can be positioned between a side 88 of the light barrier 80 and the isolation groove 70.

The input waveguide 12, the array waveguides 26 and/or the output waveguide 16 can be formed over a light barrier 80 having sides 88 adjacent to a second light transmitting medium 90.

The drain effect can play an important role in improving the performance of the filter 10 because there are a large number of waveguides 38 formed in close proximity to one another. The proximity of the waveguides 38 tends to increase the portion of light signals that act as a source of cross talk by exiting one waveguide 38 and entering another. The drain effect can reduce this source of cross talk.

Other base 42 and component 36 constructions suitable for use with a filter 10 according to the present invention are discussed in U.S. patent application Ser. No. 09/686,733, filed on Oct. 10, 2000, entitled "Waveguide Having a Light Drain" and U.S. patent application Ser. No. 09/784,814, filed on Feb. 15, 2001, entitled "Component Having Reduced Cross Talk" each of which is incorporated herein in its entirety.

Figure 12C:
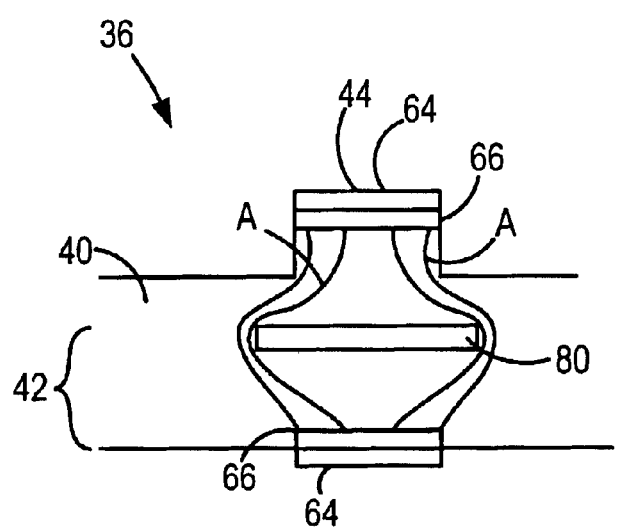
FIG. 12C illustrates the construction of FIG. 12B when an effective length tuner includes a plurality of electrical contacts.

The construction of the base 42 can affect the performance and/or the selection of the effective length tuner 28. For instance, electrical current does not readily flow through air. As a result, when the light barrier 80 is constructed from air and the base 42 is constructed as shown in FIG. 12B, the change in the index of refraction appears as shown by the lines labeled A in FIG. 12C.

FIG. 13A to FIG. 13G illustrate a method for forming a component 36 having a filter 10. A mask is formed on a base 42 so the portions of the base 42 where a light barrier 80 is to be formed remain exposed. A suitable base 42 includes, but is not limited to, a silicon substrate. An etch is performed on the masked base 42 to form pockets 84 in the base 42. The pockets 84 are generally formed to the desired thickness of the light barrier 80.

Air can be left in the pockets 84 to serve as the light barrier 80. Alternatively, a light barrier 80 material such as silica or a low K material can be grown or deposited in the pockets 84. The mask is then removed to provide the component 36 illustrated in FIG. 13A.

When air is left in the pocket 84, a second light transmitting medium 90 can optionally be deposited or grown over the base 42 as illustrated in FIG. 13B. When air will remain in the pocket 84 to serve as the light barrier 80, the second light transmitting medium 90 is deposited so the second light transmitting medium 90 is positioned adjacent to the sides 88 of the light barrier 80. Alternatively, a light barrier 80 material such as silica can optionally be deposited in the pocket 84 after the second light transmitting medium 90 is deposited or grown.

The remainder of the method is disclosed presuming that the second light transmitting medium 90 is not deposited or grown in the pocket 84 and that air will remain in the pocket 84 to serve as the light barrier 80. A light transmitting medium 40 is formed over the base 42. A suitable technique for forming the light transmitting medium 40 over the base 42 includes, but is not limited to, employing wafer bonding techniques to bond the light transmitting medium 40 to the base 42. A suitable wafer for bonding to the base 42 includes, but is not limited to, a silicon wafer or a silicon on insulator wafer 92.

A silicon on insulator wafer 92 includes a silica layer 94 positioned between silicon layers 96 as shown in FIG. 13C. The top silicon layer 96 and the silica layer 94 can be removed to provide the component 36 shown in FIG. 13D. Suitable methods for removing the top silicon layer 96 and the silica layer 94 include, but are not limited to, etching and polishing. The bottom silicon layer 96 remains as the light transmitting medium 40 where the waveguides 38 will be formed. When a silicon wafer is bonded to the base 42, the silicon wafer will serve as the light transmitting medium 40. A portion of the silicon layer 96 can be removed from the top and moving toward the base 42 in order to obtain a light transmitting medium 40 with the desired thickness.

A silicon on insulator wafer can be substituted for the component illustrated in FIG. 13D. The silicon on insulator wafer preferably has a top silicon layer with a thickness that matches the desired thickness of the light transmitting medium. The remainder of the method is performed using the silicon on insulator wafer in order to create an optical component having the base shown in FIG. 12A.

The light transmitting medium 40 is masked such that places where a ridge 44 is to be formed are protected. The component 36 is then etched to a depth that provides the component 36 with ridges 44 of the desired height as shown in FIG. 13E.

Figure 13F:
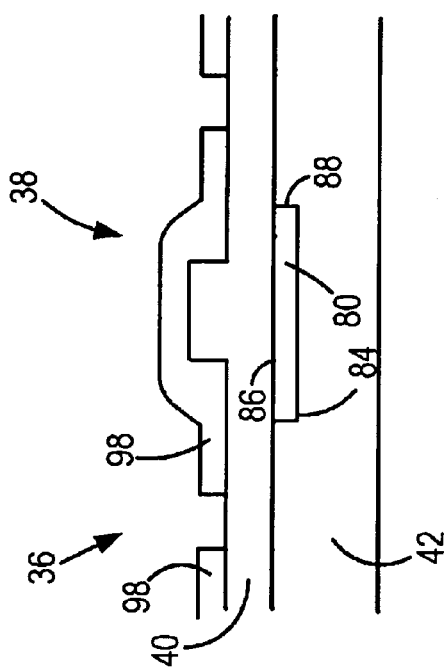
Figure 13E:
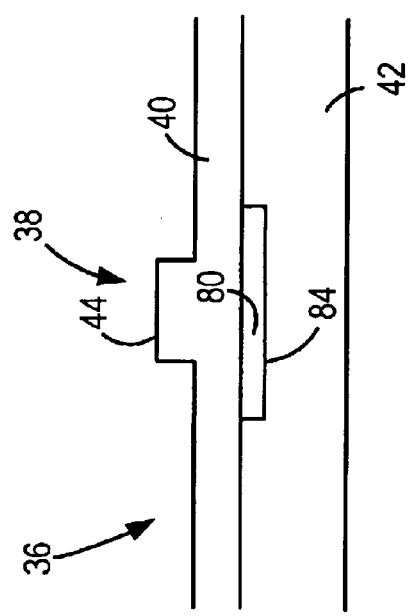
Figure 13G:
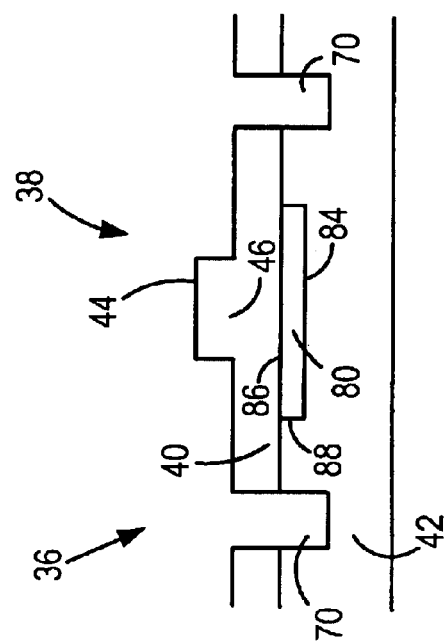

When the component 36 is to include isolation trenches, a mask 98 is formed on the component 36 so the regions where isolation trenches are to be formed remain exposed as shown in FIG. 13F. An etch is then performed to the desired depth of the isolation trenches. The mask 98 is then removed to provide the component 36 illustrated in FIG. 13G. When the light transmitting medium 40 is to be undercut as shown in FIG. 10C, an anisotropic etch can be performed so as to form the undercut. The anisotropic etch can be performed before the mask shown in FIG. 13F is removed.

As shown in FIG. 1B, the filter 10 can be constructed such that the array waveguides 26 include a reflector 34. A suitable method for forming a reflector 34 is taught in U.S. patent application Ser. No. 09/723,757, filed on Nov. 28, 2000, entitled "Formation of a Reflecting surface on an Optical Component" and incorporated herein in its entirety.

When the component 36 will include a cladding 48, the cladding 48 can be formed at different places in the method. For instance, the cladding 48 can be deposited or grown on the component 36 of FIG. 13E. Alternatively, the cladding 48 can be deposited or grown on the component 36 of FIG. 13G.

Any doped regions 66 to be formed on the ridge 44, adjacent to the ridge 44 and/or under the ridge 44 can be formed using techniques such as impurity deposition, implantation or impurity diffusion. Electrical contacts can be formed adjacent to the doped regions 66 by depositing a metal layer adjacent to the doped regions 66. Any metal layers to be used as temperature control devices 54 can be grown or deposited on the component 36. Doped regions 66, electrical contact, electrical conductors 56, pads 58 and/or metal layers can be formed at various points throughout the method and are not necessarily done after the last etch. Suitable electrical conductors 56 and pads 58 include, but are not limited to, metal traces.

The etch(es) employed in the method described above can result in formation of a facet and/or in formation of the sides 62 of a ridge of a waveguide 38. These surfaces are preferably smooth in order to reduce optical losses. Suitable etches for forming these surfaces include, but are not limited to, reactive ion etches, the Bosch process and the methods taught in U.S. patent application Ser. No. 09/690,959; filed on Oct. 16, 2000; and entitled "Formation of a Smooth Vertical Surface on an Optical Component" which is incorporated herein in its entirety.

All of the array waveguides 26 need not include an effective length tuner 28. As noted above, the array waveguide grating 24 is constructed so the effective length change differential, δ1, is a constant. This condition can be met without the shortest array waveguide 26 having an effective length tuner 28 or without the longest array waveguide 26 having an effective length tuner 28. The tuning range can be increased when one of the array waveguides 26 does not include an effective length tuner 28. For instance, an increased tuning range is achieved when the shortest array waveguide 26 does not have an effective length tuner 28 and an effective length tuner 28 extends the entire length of the longest array waveguide 26.

In the embodiments illustrated above, the effective length tuners 28 are shown as being positioned adjacent to a portion of the length of the array waveguides 26, however, the effective length tuners 28 can be positioned adjacent to the entire length of one or more of the array waveguides 26. Additionally, the effective length tuners 28 need not have an effective are positioned adjacent to the first light distribution component 14 and/or the second light distribution component 18. As a result, the effective length tuners 28 need not change the optical characteristics of the first light distribution component 14 and/or the second light distribution component 18.

Many of the effective length tuners 28 are shown as being positioned adjacent to a curved region of an array waveguide 26. However, each array waveguide 26 can include one or more straight sections and the effective length tuners 28 can be positioned along these straight sections.

Many of the arrayed waveguide 38 gratings 24 above are illustrated as having six or fewer array waveguides 26 for the purposes of illustration. Array waveguide gratings 24 according to the invention can include tens to hundreds of array waveguides 26.

Although the invention is disclosed in the context of optical components having ridge waveguides, the principles of the invention can be extended to optical components that include other waveguide types such as buried channel waveguides and strip waveguides.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A filter, comprising:
a light distribution component having an output side;
a plurality of array waveguides each defined by a ridge extending from a slab of a light transmitting medium positioned on a base, the array waveguides configured to deliver a light signal into the light distribution component such that the light signal is incident on the output side of the light distribution component;
the light transmitting medium defining at least a portion of a groove extending into the slab of the light transmitting medium between array waveguides such that the groove is spaced apart front the ridges defining may waveguides adjacent to the groove, a material in the groove being located over the base and between different regions of the light transmitting medium; and
one or more effective length tuners configured to tune the effective lengths of a plurality of the array waveguides such that the location where the light signal is incident on the output side changes.

2. The filter of claim 1, wherein the effective length tuners are configured to change the effective lengths of array waveguides such that the difference in the amount of effective length change between adjacent array waveguides is the same for different pairs of adjacent array waveguides.

3. The filter of claim 2, wherein the amount of the effective length change of an array waveguide is different for each array waveguide adjacent to an effective length tuner.

4. The filter of claim 2, further comprising;
electronics for operating the one or more effective length tuners so saw change the effective length such that the amount of the effective length change between adjacent army waveguides is a constant.

5. The filter of claim 1, wherein each effective length tuner has a different effective area and the effective area for each effective length timer is not positioned over the light distribution component, the effective area being the area of the effective length tuner that causes the change a effective length.

6. The filter of claim 1, wherein ouch effective length tuner has an effective area and die difference in the effective area for adjacent array waveguides is a constant, the effective areas being the area of the effective length tuner that causes the change in effective length.

7. The filter of claim 6, wherein the affective area of each effective length tuner is different.

8. The filter of claim 1, wherein each effective length tuner has an effective area with a different average length and the difference in the average length for adjacent any waveguides is a constant.

9. The filter of claim 8, wherein the array waveguides each have a different average length and the difference in the average length of adjacent array waveguides is a constant, the difference in the average length of adjacent array waveguides being less than the average length of the effective area for adjacent array waveguides.

10. The filter of claim 1, wherein the length of an effective area of each effective length tuner is different for each may waveguide and the difference in the length for adjacent array waveguides is a constant.

11. The filter of claim 1, further including electrical conductors to provide electrical communication between at least two effective length tuners.

12. The filter of claim 1, wherein the effective length tuners are temperature control devices.

13. The filter of claim 1, wherein each effective length tuner includes a plurality of electrical contacts.

14. The filter of claim 1, wherein each array waveguide is at least in part defined by a ridge and at least a portion of each effective length tuner is positioned over a ridge.

* * * * *